(12) United States Patent
Mailen

(10) Patent No.: US 12,054,223 B2
(45) Date of Patent: Aug. 6, 2024

(54) SLIDINGLY-ENGAGING TWO-PIECE UPPER CHAIN GUIDE

(71) Applicant: Eko Sport, Inc., Grand Junction, CO (US)

(72) Inventor: Sean Mailen, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 0 days.

(21) Appl. No.: 18/113,854

(22) Filed: Feb. 24, 2023

(65) Prior Publication Data

US 2023/0286611 A1    Sep. 14, 2023

Related U.S. Application Data

(60) Provisional application No. 63/319,730, filed on Mar. 14, 2022.

(51) Int. Cl.
*B62M 9/10* (2006.01)
*B62M 9/00* (2006.01)
*B62M 9/02* (2006.01)

(52) U.S. Cl.
CPC ....... *B62M 9/105* (2013.01); *B62M 2009/007* (2013.01)

(58) Field of Classification Search
CPC ........... B62M 9/105; B62M 2009/007; B62M 9/136; F16H 7/18; F16H 57/035; F16H 2057/0235; F16H 2007/185; F16H 2057/0325; B62J 13/00; B62J 13/06; B62J 13/02
USPC ................................................. 474/140, 144
See application file for complete search history.

(56) References Cited

U.S. PATENT DOCUMENTS

| 4,573,950 A | 3/1986 | Nagano |
| 4,832,667 A | 5/1989 | Wren |
| 5,002,520 A | 3/1991 | Greenlaw |
| 5,460,576 A | 10/1995 | Barnett |
| 6,354,973 B1 | 3/2002 | Barnett |
| 7,059,983 B2 | 6/2006 | Heim |
| 8,235,849 B2 * | 8/2012 | Cranston .................. B62J 13/00 280/727 |
| RE44,379 E | 7/2013 | Rogers |
| 8,475,307 B2 | 7/2013 | Bodensteiner et al. |
| 8,491,429 B2 | 7/2013 | Cranston et al. |

(Continued)

FOREIGN PATENT DOCUMENTS

DE   102019101388 A1   7/2020

OTHER PUBLICATIONS

Chain Guide—ISCG05, [online], Retrieved from https://www.oneupcomponents.com/, OneUp Components, United States of America.

(Continued)

*Primary Examiner* — Michael R Mansen
*Assistant Examiner* — Katelynne R Burrell
(74) *Attorney, Agent, or Firm* — Jason H. Foster; Kremblas & Foster

(57) ABSTRACT

An assembly for minimizing the disengagement of a chain from a chain ring is disclosed. The assembly includes an inboard leg and an outboard leg. The outboard leg is configured to slide vertically relative to the inboard leg. A fastener passes through the inboard leg and outboard leg and defines the upper and lower limit of sliding of the outboard leg.

18 Claims, 27 Drawing Sheets

(56) References Cited

U.S. PATENT DOCUMENTS

| | | |
|---|---|---|
| 8,534,693 B2 | 9/2013 | Sloan et al. |
| 8,961,342 B2 | 2/2015 | Emura et al. |
| 8,968,129 B2 | 3/2015 | Emura et al. |
| 8,991,846 B2 | 3/2015 | Twers |
| RE45,508 E | 5/2015 | Rogers |
| 9,121,446 B2 | 9/2015 | Kim |
| 9,249,867 B2 | 2/2016 | Graziosi et al. |
| 9,327,786 B2 | 5/2016 | Cranston et al. |
| 9,714,067 B1 | 7/2017 | Hara |
| D794,512 S | 8/2017 | McGarry |
| 9,896,157 B2 | 2/2018 | Emura et al. |
| 9,919,765 B2 | 3/2018 | Wickliffe et al. |
| 10,053,188 B2 * | 8/2018 | Staples .................. B62M 9/121 |
| 10,464,635 B2 * | 11/2019 | Pfeiffer .................... B62J 13/00 |
| 10,787,227 B2 * | 9/2020 | Staples .................. B62M 9/105 |
| 11,077,916 B2 * | 8/2021 | Fujimoto ................. B62M 9/12 |
| 11,524,746 B2 | 12/2022 | Barefoot et al. |
| 11,603,167 B2 | 3/2023 | Charette et al. |
| 11,613,326 B2 | 3/2023 | Barefoot et al. |
| 2002/0160869 A1 | 10/2002 | Barnett |
| 2004/0009835 A1 | 1/2004 | Heim |
| 2004/0060316 A1 | 4/2004 | Ito et al. |
| 2006/0199690 A1 | 9/2006 | Gardner et al. |
| 2007/0032324 A1 | 2/2007 | Uchiyama et al. |
| 2007/0265121 A1 | 11/2007 | Gross |
| 2009/0062049 A1 | 3/2009 | Cranston et al. |
| 2009/0220319 A1 | 9/2009 | Weagle |
| 2012/0142469 A1 | 6/2012 | Barefoot et al. |
| 2012/0248730 A1 | 10/2012 | Sloan et al. |
| 2013/0053196 A1 | 2/2013 | Emura et al. |
| 2015/0259030 A1 | 9/2015 | Nakano |
| 2015/0344105 A1 | 12/2015 | McGarry |
| 2017/0045121 A1 | 2/2017 | Staples |
| 2018/0022418 A1 | 1/2018 | Pfeiffer |
| 2018/0319459 A1 | 11/2018 | Staples |
| 2022/0106015 A1 | 4/2022 | Winans et al. |
| 2023/0010468 A1 | 1/2023 | Davis et al. |

OTHER PUBLICATIONS

Chain Keeper, [online], Retrieved from https://www.paulcomp.com/, [2019], Paul Component Engineering, United States of America.
FSA Grid Chain Guide, [online], Retrieved from https://www.fullspeedahead.com/, [2019], Apr. 7, 2017, Full Speed Ahead, United States of America.
Weagle NPL_Oct. 17, 2013 9, photo.
Weagle NPL_Oct. 17, 2013 10, photo.
Weagle NPL_Oct. 17, 2013 16, magazine, p. 138.
Weagle NPL_Oct. 17, 2013 19, Chainguide, RACE FACE Performance Products, 2005.
Weagle NPL_Oct. 17, 2013 21, Universal Chainguide System, brochure, Mountain Cycle Simply the Best, United States of America.
Weagle NPL_Oct. 17, 2013 22, Universal Chainguide System, brochure, Mountain Cycle Simply the Best, United States of America.
Weagle NPL_Oct. 17, 2013 23, Universal Chainguide System, brochure, Figures 1-8, Mountain Cycle Simply the Best, United States of America.
Chain Guide—ISCG05-V2, [online], Retrieved from https://www.oneupcomponents.com/products/chain-guide-iscg05-v2, Apr. 15, 2019, OneUp Components, United State of America.

\* cited by examiner

SLIDINGLY-ENGAGING TWO-PIECE UPPER CHAIN GUIDE

BACKGROUND OF THE INVENTION

The present disclosure relates to a chain guide for a bicycle. More specifically, the present design relates to a chain guide for use adjacent a front gear of a bicycle, where the chain guide is adjustable in multiple orientations, at least one of which is adjustable separately from the others.

Bicycles come in many different shapes and sizes. Riders change their bicycles in a variety of ways so that the bicycles perform in the manner a rider desires. In some cases, the rider may select a particular frame size that fits them in a particular manner. They may select a particular handlebar or tire style, depending on whether they are doing road racing or off-road riding. They may select a particular suspension style, depending on the number and type of obstacles they may encounter.

In addition to these considerations, riders may wish to vary the chain rings that they use with their bicycles to better tune the torque they will require to properly ride in a particular location. A rider may want to select from a variety of chain rings and change them depending on what type of riding they plan to do. However, when a chain ring size is changed, that change may affect other features of the bicycle. In addition, a rider may want to minimize expense by using the same accessory equipment on different bicycles, including bicycles with different overall styles. In addition, bicycle manufacturers may design a frame to have a different chain line from other frames.

In some riding situations, it may be desirable to use a chain guide to minimize the risk of the chain becoming detached from the chain ring. It is conventional to use a chain guide in the area where the bicycle chain comes into contact with a front chain ring or chain ring set and also in the area where the bicycle chain moves away from contact with the front ring or ring set. It is also conventional to secure the chain guide or guides to a bracket or plate that is attached to the bicycle frame adjacent the front chain ring. An example of such a device may be found in U.S. Pat. No. 8,235,849.

However, it is common for a rider to change the chain rings used on a particular bicycle and to use different bicycle frames for riding. Different chain rings incorporated on different bicycle frames will cause the chain to enter and leave the front chain ring set at a variety of angles. The chain guide may be helpful in guiding the chain into proper engagement with the front chain ring and to exit the chain ring at an appropriate angle before returning to the rear chain ring set. However, the chain guide is most useful if it is adjustable to accommodate the differences in chain position caused by the other changes.

In some circumstances, a chain may become disengaged from the remainder of the drive train, such as the chain rings, while riding. This may occur for a variety of reasons, including contact with obstacles, the lodging of a small rock or mud in one or a series of chain cavities, rider foot misplacement, or several other reasons. In addition, debris may become lodged in a chain ring and cause the riding to be negatively affected. When all the chain guides attached near a chain ring are fixed in place, it may be difficult for a rider to easily remove and/or reinstall the chain onto the chain rings and be on his or her way. If such a circumstance were to occur when the rider is near his or her vehicle or home, the rider could easily use tools to remove some of the chain guides, do any necessary cleaning or adjustments, replace the chain, and then use the tools to reinstall the chain guides. However, because these circumstances often occur when a rider is remote from such locations, tools to make these removals and adjustments are not readily available.

In addition, many riders prefer that an adjustment system provide for a low risk of parts becoming lost and separated from one another. It is desirable to use a system that maintains as many parts as possible in a single assembly, even when loosened or otherwise adjusted.

Accordingly, in many embodiments, it may be desirable to incorporate a structure into the chain guide assembly that allows the rider to adjust or remove some or all of the chain guide assembly without requiring the use of a tool. It may be desirable in some embodiments for a rider to be able to leave one portion of the guide assembly locked in place on the bicycle, so that the position and orientation of the chain guide assembly need not be adjusted after the rider makes the necessary cleaning, adjustments, or re-installation of the chain.

SUMMARY OF THE INVENTION

The present invention is directed to an assembly for minimizing the disengagement of a chain from a chain ring.

The assembly may include an inboard leg, an outboard leg, a first mating portion on the inboard leg, and a second mating portion on the outboard leg. The first mating portion and the second mating portion may interfit with one another to connect the inboard leg to the outboard leg. The first mating portion and the second mating portion may be configured to engage with one another by sliding the outboard leg relative to the inboard leg. A shaft may be configured to pass through the inboard leg and at least a portion of the outboard leg.

At least one of the first mating portion and the second mating portion may comprise a finger. The other of the first mating portion and the second mating portion may comprise a groove. The assembly may further comprise a fastener. The fastener may be configured to pass through a first aperture in the outboard leg and a second aperture in the inboard leg and to contact the shaft. The second aperture may be elongated. When the outboard leg is positioned in a first position, the fastener may contact a first end of the elongated second aperture. When the outboard leg is positioned in a second position, the fastener may contact a second end of the elongated second aperture.

In another embodiment an assembly for minimizing the disengagement of a chain from a chain ring may include an inboard leg having a first inboard leg aperture and a second inboard leg aperture, an outboard leg having a first outboard leg aperture and a second outboard leg aperture, a shaft configured to pass through the first inboard leg aperture and at least partially through the first outboard leg aperture, and a fastener configured to pass through the second inboard leg aperture and the second outboard leg aperture. The second outboard leg aperture may be elongated and the outboard leg is configured to move between a first position where the fastener contacts a first end of the second outboard leg aperture and a second position where the fastener contacts a second end of the second outboard leg aperture.

The outboard leg may be configured to slide relative to the inboard leg. The outboard leg may be configured to slide substantially vertically relative to the inboard leg. The second elongated aperture may be oriented substantially vertically. Engagement of the fastener and the shaft may be capable of substantially restricting lateral and vertical movement of the inboard leg. Engagement of the fastener and the shaft may be capable of substantially restricting lateral movement of the outboard leg. The outboard leg may include a first mating portion and the inboard leg may include a second mating portion. At least one of the first mating portion and the second mating portion comprises a finger. The other of the first mating portion and the second mating portion may comprise a groove.

Figure 1:
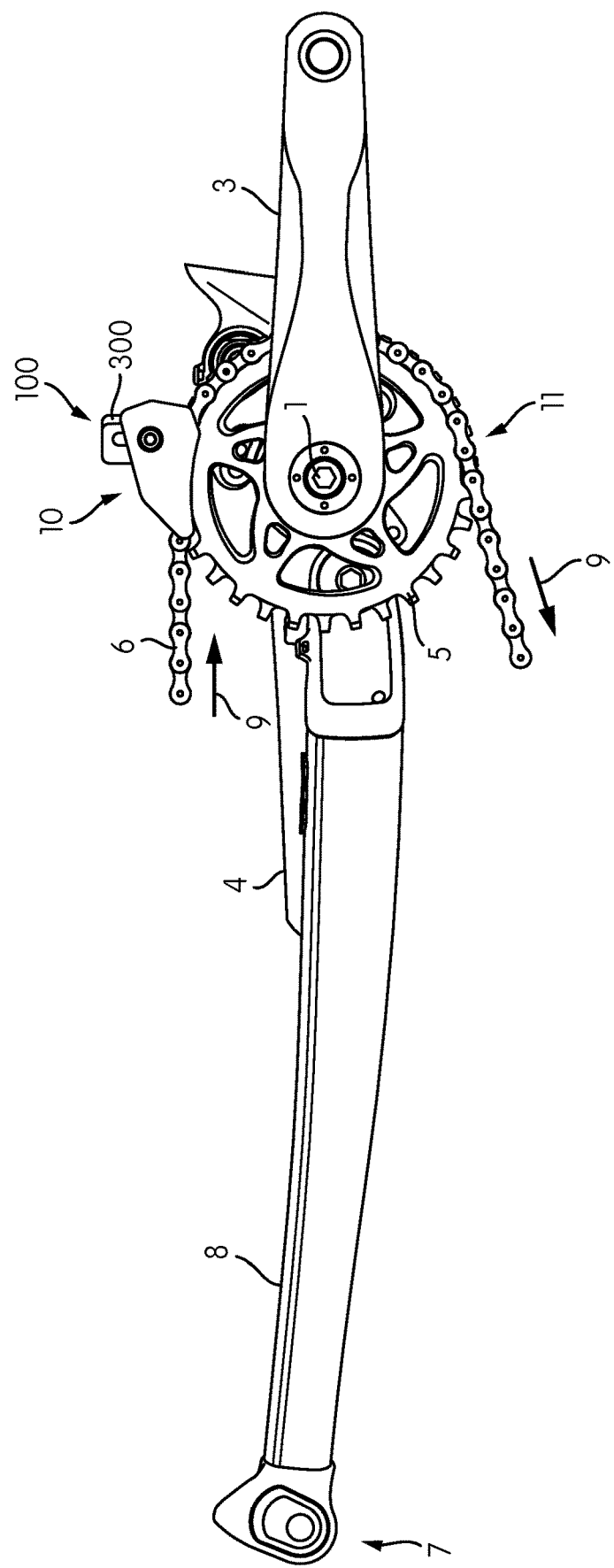
FIG. 1 is a side view of the assembly according to the disclosure, showing the relevant position of the assembly on a bicycle frame.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In this detailed description, various terms relating to direction may be used. The elements discussed herein relate to a bicycle. Because, in its operable position, a bicycle is oriented generally vertically, i.e., perpendicular to the ground, the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between one item and a vertical plane substantially bisecting the bicycle. The term "outboard" describes a position of an object further from the vertical center plane of the bicycle. In addition, the terms "bicycle" and "bike" are used herein interchangeably. A person having ordinary skill in the art will understand that if something is referred to as one, it can refer to the other.

The present device relates to an assembly for minimizing the risk of disengagement of a chain from a chain ring. The illustrations herein only partially show the bicycle structure. However, an ordinary designer will fully understand how the structures described herein may be incorporated into a bicycle.

Figure 2:
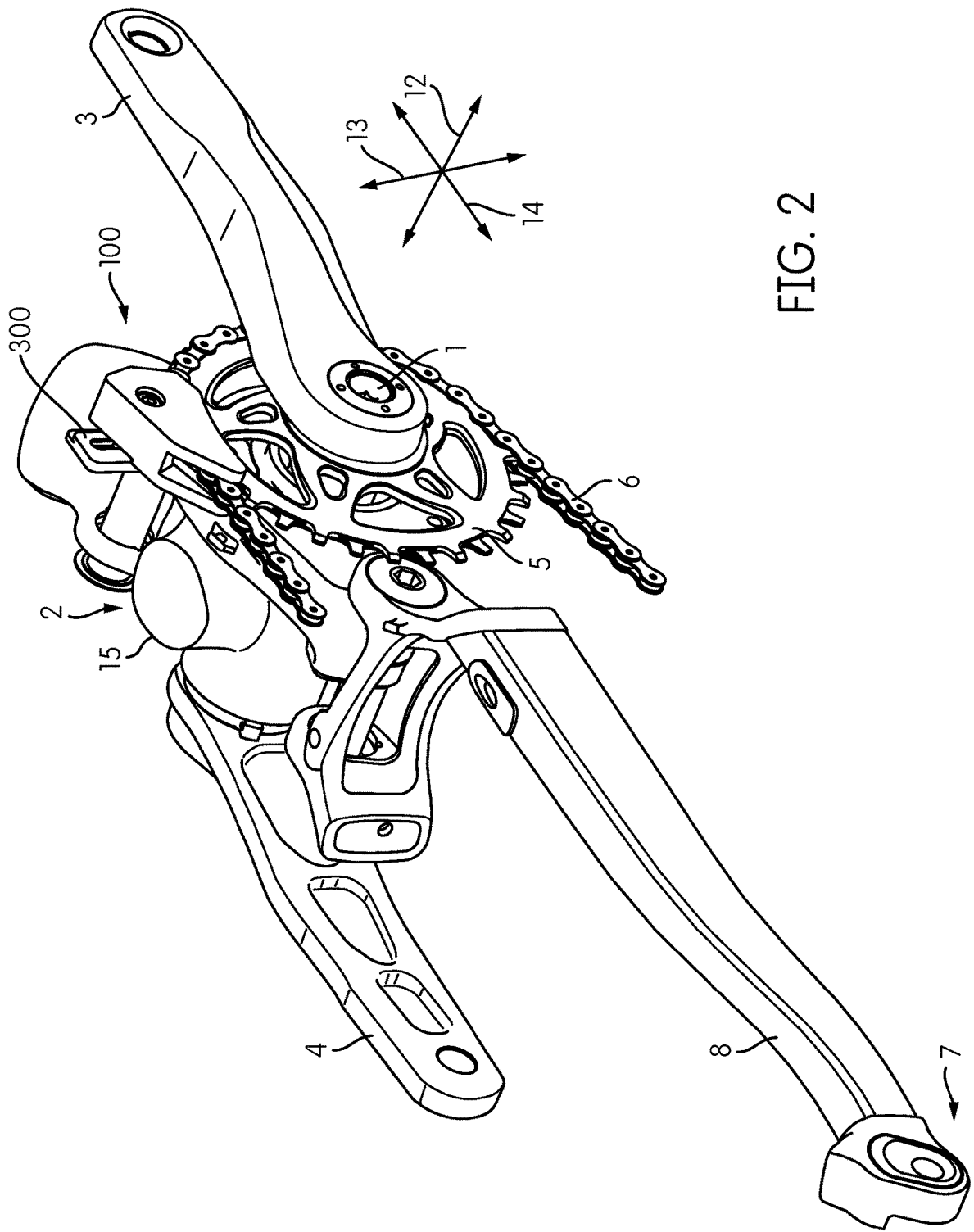
FIG. 2 is a perspective view of the assembly as shown in FIG. 1.
Figure 4:
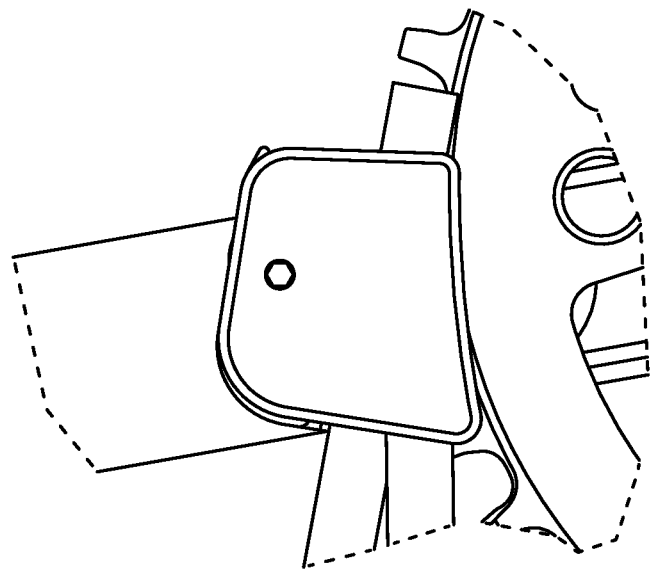
FIG. 4 is a closer side view of the embodiment of FIG. 3.
Figure 3:
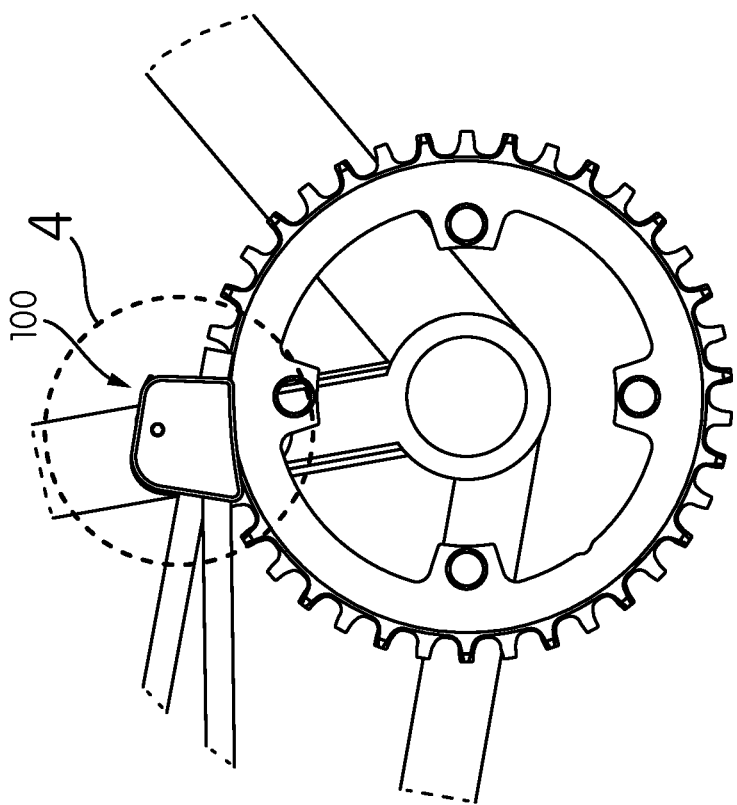
FIG. 3 is a side view of a first embodiment of the assembly without some of the drive train.

Turning to FIGS. 1 and 2, when a rider rides a bicycle, the rider presses their feet in a rotational manner on pedals (not shown) attached to a crank shaft 1. The crank shaft may extend through a bottom bracket 2 of a bicycle frame 15 and may maintain the pedals and the arms 3, 4 attached between the pedals and the crank shaft 1 in an opposite orientation, where they are around 180 degrees apart, as shown. One or more chain rings 5 may be mounted on or adjacent the crank shaft 1. A chain 6 may engage the chain ring 5 and may also engage additional, rear chain rings or the cassette (not shown), which are conventionally mounted at a location at the rear end 7 of an arm 8. When the rider uses the pedals and thereby rotates the chain ring 5, the chain 6 may move into and out of engagement with the chain ring 5 and a gear on the cassette. When the bicycle is in use, in typical circumstances, the rider may move the pedals and the arms 3,4 in a clockwise direction, and the chain 6 may move in the direction of the arrows 9, although many bicycles may allow a rider to pedal in a counterclockwise direction. In most conventional bicycles for adults, a conventional ratchet system (not shown) may be incorporated into the bicycle to disengage the drive force of the drive chain 6 from the rear shaft and wheel (not shown) whenever the pedals are moved in a direction other than clockwise, for example, when coasting. A rider may use a variety of different bicycles and may install a variety of sizes of chain rings 5 in the location shown and in the cassette at the rear location 7. Indeed, riders may select a single front ring 5 or a series of front rings 5 installed adjacent one another in a conventional manner and may select between any number of gears that are installed in the cassette in the rear area 7. Many riders may select two front gears and five rear gears (a "ten speed"), three front gears and seven rear gears (a "twenty-one speed"), or another combination. The choice of the number and size of each ring can be individually selected by the rider to support the type of riding the rider wishes to do and the amount of torque the rider is interested in using to ride. Because of this variability in the number and size of rings and the size of different types of bicycle frames 15, there is a variability in the lateral and vertical angle at which the chain 6 engages the chain ring 5 in the engagement area 10 and in the lateral and vertical angle at which the chain 6 exits the chain ring 5 in the disengagement area 11 (chain line). Looking at FIG. 3, simple straight lines have been used tangential to the arc of the chainring to represent the spatial envelope occupied by the chain, these lines show two different positions of the chain corresponding to its engagement with different rear wheel cogs (not shown) of the bicycle.

Among the risks in riding a bicycle is the risk of the chain 6 becoming disengaged from the drive system (chain ring 5 and the rear cassette). While it is inconvenient when a chain falls off when a rider is riding on a neighborhood path near their house, it can be dangerous when a rider is riding in an untraveled area on a mountain or wilderness area. While a rider may deliberately select drive gears so that the risk of chain disengagement due to the relative angles of the chain is reduced, not all variables can be controlled. Sticks and rocks and other items in the environment may contact the chain while the rider is riding and also affect the angle of the chain. Accordingly, many riders may choose to incorporate a guide to help position the chain 6 as it enters the engagement area 10 or leaves the disengagement area 11 to minimize the risk of disengagement.

In the present illustration, the assembly 100 to be described and claimed in further detail herein (along with other embodiments of the assembly with other numbers) is shown as being generally in the engagement area 10 of the front chain ring 5. In other embodiments, a functional equivalent of the assembly could be positioned in the disengagement area 11 of the front chain ring 5. In other embodiments, the assembly could be positioned in the engagement or disengagement areas of the rear cassette. A typical designer will be able to adjust the precise configuration of the assembly 100 to work in one of the other locations. As noted above, the chain 6 can be moved in the opposite direction from the direction 9, and accordingly, the disengagement area 11 can become an engagement area 10 when the arms 3, 4 are rotated counterclockwise.

In the illustrated embodiments, the disclosure may refer to a first or inboard leg and a second or outboard leg. The inboard leg and the outboard leg in each embodiment may have different features from one another. It will be apparent to one of ordinary skill in the art that features shown as being on an inboard leg may instead be incorporated into an outboard leg and that a corresponding inboard leg could then incorporate the features of the leg described herein as an outboard leg. Further, while the inboard leg and outboard leg are shown as having particular overall shapes or profiles, the particular shape of a leg may be selected by a designer for a variety of functional and aesthetic reasons, and the shape of the inboard leg and outboard leg are not specifically relevant to the functional features described herein. Further, while the described embodiments are shown as having an inboard leg and an outboard leg that have similar shapes and sizes, this feature is also not critical to the function and other features of the assembly. A person having ordinary skill in the art may make a variety of changes relating to the shape and size of the legs in known ways without affecting the function of the embodiments described herein.

The present disclosure is directed to an assembly for minimizing the risk of a chain becoming detached from a chain ring. The assembly 3300 may be best seen in examining FIGS. 5 and 6. The assembly 3300 may include a fixed bracket 3302 that may be attached to the bicycle frame 15 (see FIG. 2) in a conventional manner. In the embodiment illustrated in FIGS. 5 and 6, the fixed bracket 3302 may define a first slot 3303 and a second slot 3305. A first fastener 3304 may be configured to pass through the first slot 3303 and enter a first threaded recess on the frame (not shown). The second fastener 3307 may be configured to pass through the second slot 3305 and enter a second threaded recess on the frame (not shown). The first slot 3303 and the second slot 3305 may be configured to allow the use of ISCG spacing or any other desirable spacing. The fixed bracket 3302 may be secured to the frame 15 in any conventional manner that varies from the one shown in the FIGS, as is well known by persons of skill in the art, such as through direct mount or other mechanisms.

The fixed bracket 3302 may define a third slot 3306. The assembly 3300 may further include a slidable bracket 3308 having a first end 3319 and a second end 3322. The slidable bracket 3308 may be adjustably secured to the fixed bracket 3302 by a third fastener 3310. In some embodiments, the third fastener 3310 may pass through a first aperture 3312 defined in the slidable bracket 3308. In some embodiments, it may be desirable for the first aperture 3312 to be scalar to the fixed bracket 3302 when the slidable bracket 3308 is placed in operative position relative to the fixed bracket 3302. In some embodiments, using a bolt, screw or other conventional fastener positioned in such a manner may allow a user to more easily access the head 3311 of the third fastener 3310. In some embodiments, the head 3311 of the third fastener 3310 may be configured with a hex recess 3313 to allow the third fastener 3310 to be tightened and loosened using a conventional hex wrench. In order to adjust a vertical position of the slidable bracket 3308, a user may insert a conventional hex wrench (not shown) into the hex recess 3313 on the third fastener 3310. The user may rotate the hex wrench to loosen the third fastener 3310 and remove the frictional or press engagement between the third fastener 3310 and the fixed bracket 3302. This rotation and release may allow the slidable bracket 3308 to slide relative to the fixed bracket 3302.

Figure 6:
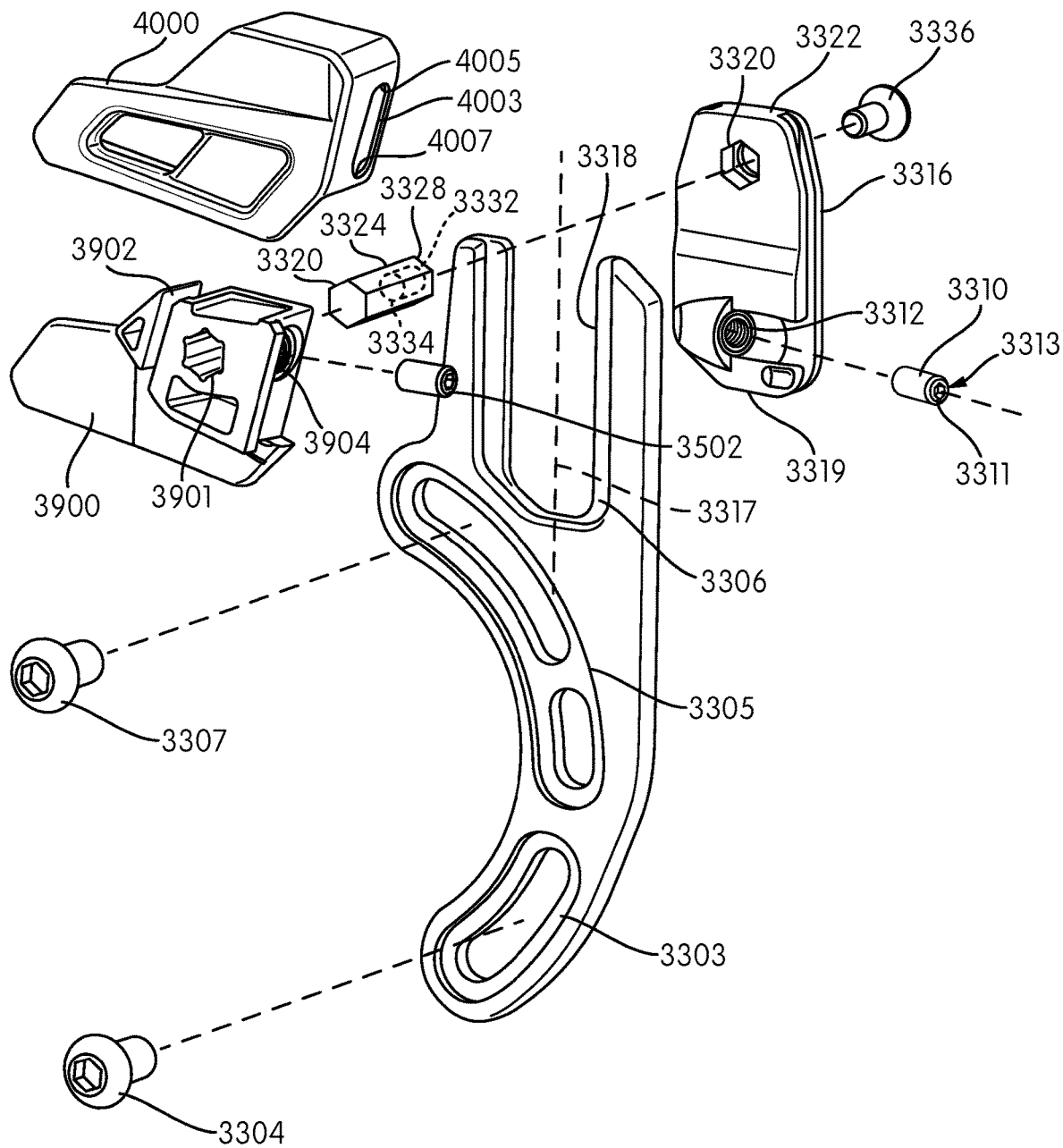
FIG. 6 is an exploded view of the embodiment of FIG. 5.
Figure 7:
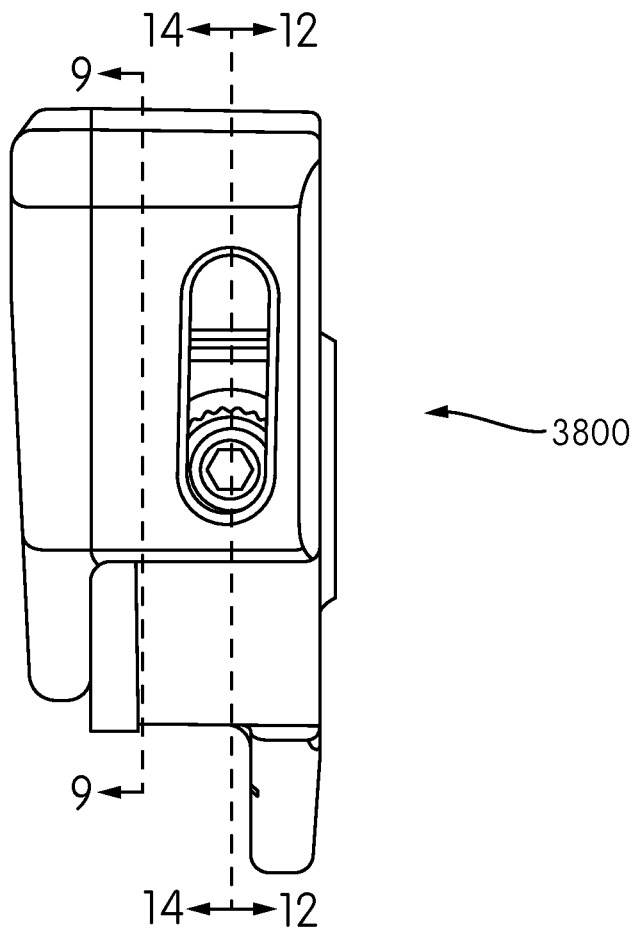
FIG. 7 is an end view of an assembled inboard leg and outboard leg according to the embodiment of FIG. 5.
Figure 8:
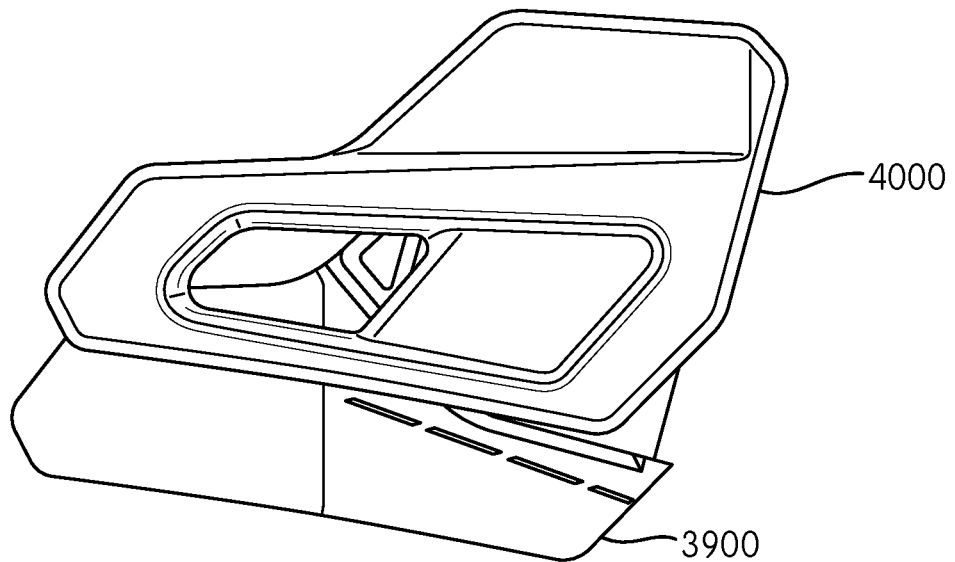
FIG. 8 is a side view of the legs of FIG. 5.
Figure 9:
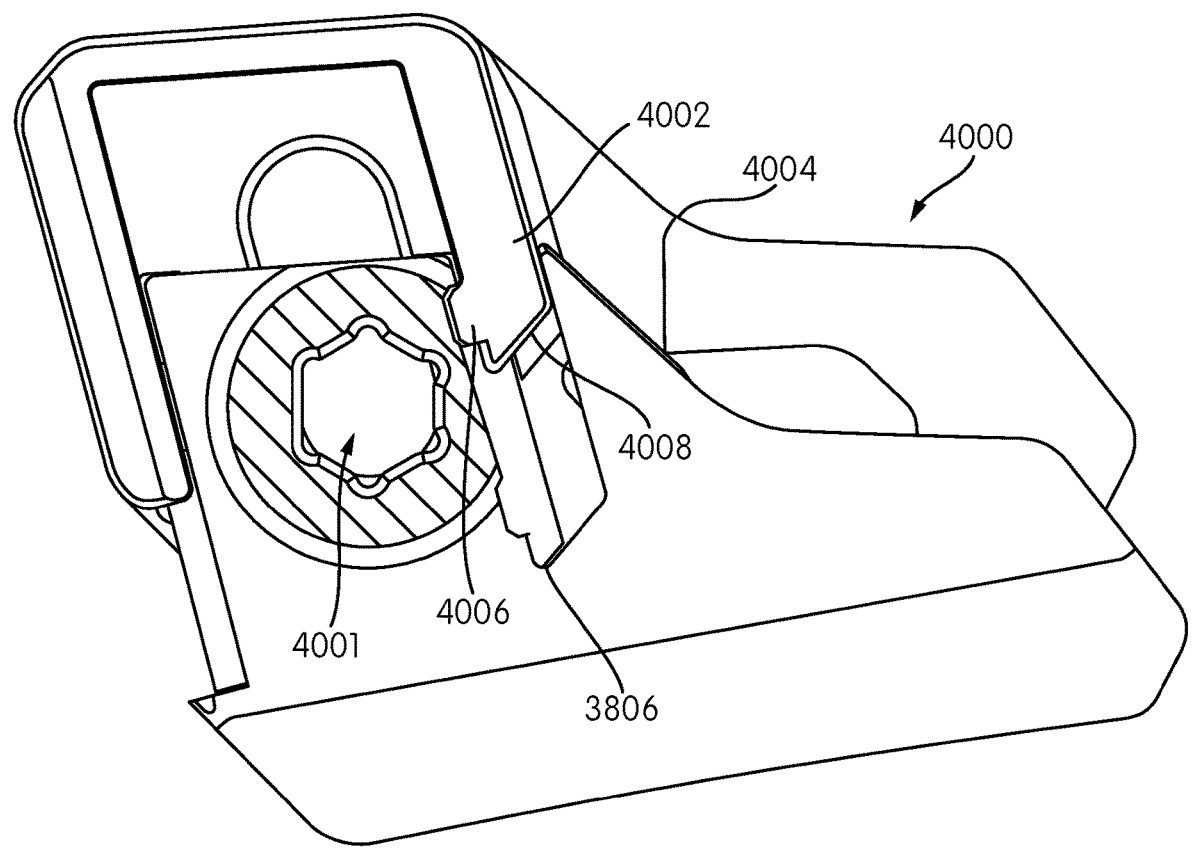
FIG. 9 is a partial cross-sectional view of the legs of FIG. 7 when the outboard leg is in an upper position taken along line 9-9 of FIG. 7.

In some embodiments, the slidable bracket 3308 may have a first mating face 3316 (see FIG. 6) and the fixed bracket 3302 may have a second mating face 3318 (see FIG. 6). The first mating face 3316 and the second mating face 3318 may include one or more discontinuities to provide for proper alignment and slidability of the fixed bracket 3302 and the slidable bracket 3308. In many embodiments, one of the first mating face 3316 and the second mating face 3318 may include a projection or finger and the other of the first mating face 3316 and the second mating face 3318 may include a groove or recess. The finger and groove may be positioned to be approximately parallel to an axis 3317 of the at least one slot 3306 when in operative position, to give a user a tactile and visual aid to positioning the fixed bracket 3302 and the slidable bracket 3308 in an appropriate position to align the at least one slot 3306 and the first aperture 3312 into a position where the fixed bracket 3302 and the slidable bracket 3308 may be easily secured to one another using the third fastener 3310. This position and configuration of the third fastener 3310 within the first aperture 3312 may allow a user to access the third fastener 3310 from a front of the bicycle, rather than needing to thread a hex wrench or other tightening mechanism through a chain ring or past the frame of a bicycle. The use of such a fastener 3310 may be particularly advantageous in off road situations where a user must make adjustments on the fly based on riding conditions.

The first aperture 3312 may be defined near the first end 3319 of the slidable bracket 3308. The slidable bracket 3308 may further define a second aperture 3320 near the second end 3322. A shaft 3324 may pass through the second aperture 3320 and may be secured to the slidable bracket 3308. In many embodiments, the shaft 3324 and the second aperture 3320 may correspond in size and shape so that the shaft 3324 and the aperture are a relatively tight fit. In the illustrated embodiments, the shaft 3324 and the second aperture 3320 may be hexagonal. In many embodiments, it may be desirable for the cross-sectional shape of the shaft 3324 and the aperture 3320 to be selected to minimize the possibility of the shaft 3324 rotating within the aperture 3320. A hexagonal shape may be selected because it is commonly used in the biking industry. In another embodiment, a square, triangular, octagonal, lobed or other shape could be used based on the size of the shaft 3324 and the particular application made by a designer. The use of a hexagonal or other regular-sided profile may allow a user to use a wrench or other tool to easily attach the shaft 3324 to the slidable bracket 3308 or remove it therefrom. The hexagonal profile may allow a user to firmly grip the shaft manually if the user wishes to secure or remove it without the use of a tool. If rotation of the shaft 3324 is not a concern, the cross-sections of the shaft 3324 and the second aperture 3320 may be circular. In many embodiments, a designer may select a profile that a user may find aesthetically pleasing, in addition to having other, functional features.

Figure 10:
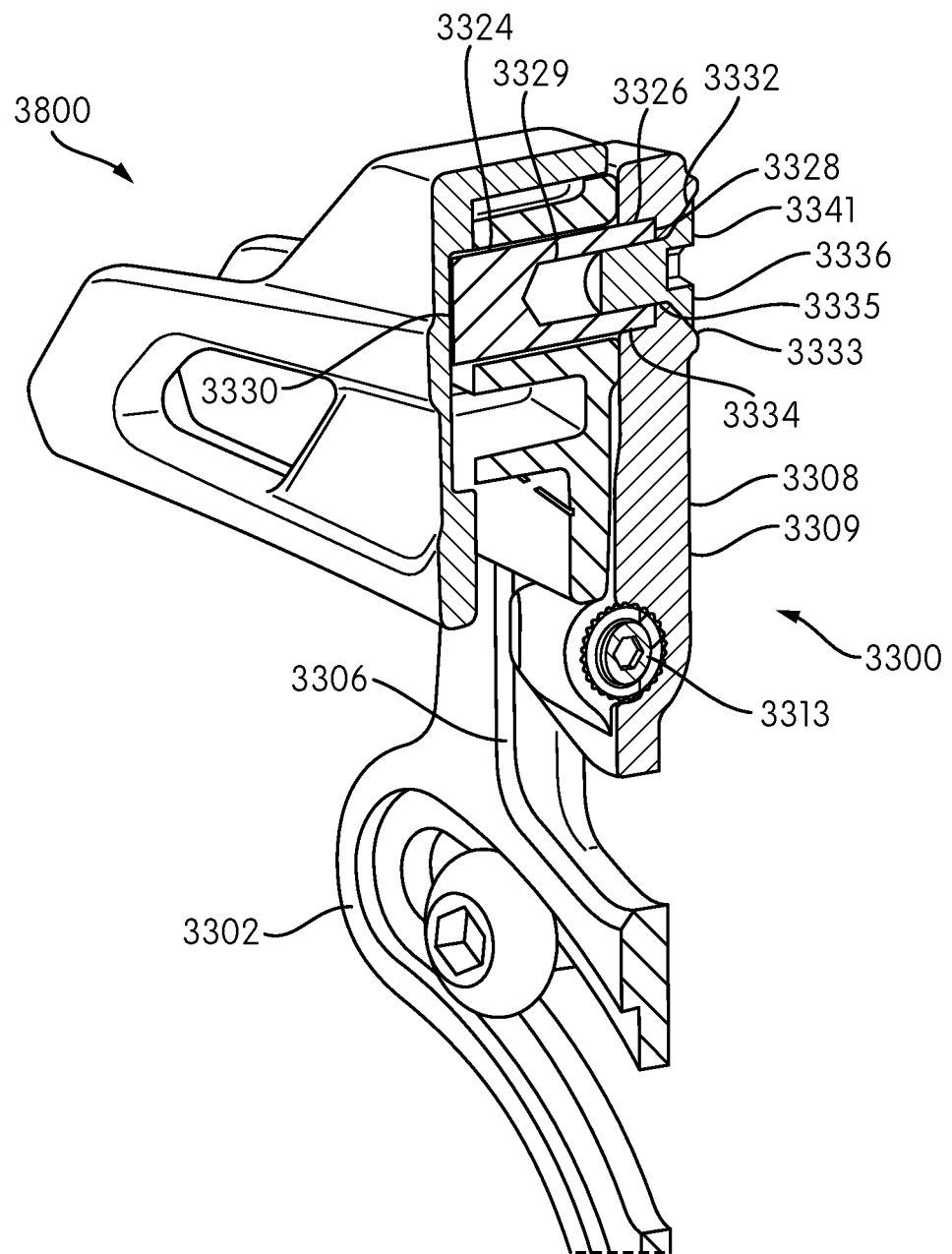
FIG. 10 is a cross-sectional of the assembly taken along line 10-10 of FIG. 5.

The configuration of the shaft 3324 and how it is attached to the rest of the assembly 3300 may be best seen in the cross-sectional view of FIG. 10. The shaft 3324 may include a first end 3328 and a second end 3330. The shaft aperture 3326 may include a corresponding first end 3332 and a second end 3334. The first end 3328 of the shaft 3324 may include an internally threaded aperture 3329. A fourth fastener 3336 may be externally threaded and may pass through the second aperture 3320 in the slidable bracket 3308 and into the threaded aperture 3329 of the shaft aperture 3326. The fourth fastener 3336 and the shaft 3324 may then be tightened by relatively rotating to removably secure the shaft 3324 to the slidable bracket 3308 by clamping the slidable bracket 3308 therebetween in the configuration shown in FIG. 10. In the embodiment shown in FIG. 10, the head 3341 of the fourth fastener 3336 may be shaped and sized to correspond with a corresponding cavity 3333 near the first end 3332 of the second aperture 3332. In many embodiments, such as the illustrated embodiment, it is desirable for the head 3341 of the fourth fastener 3336 to be substantially flush with the second side 3309 of the slidable bracket 3308. Using a shaft aperture 3326 with a recess or cavity 3333 and allowing the head 3341 to fit within the recess 3333 may minimize the risk of the bolt head 3341 becoming dislodged from the slidable bracket 3308 and the shaft 3324 in riding conditions. In some embodiments, the shaft 3324 may be a 6 mm hex extrusion.

In the illustrated embodiment, the second aperture 3326 is shown as having a discontinuous profile as will be described in this paragraph. The first end 3332 of the second aperture 3326 may have a tapered profile for the cavity 3333 to mate with a similarly tapered head 3341 of the fourth fastener 3336. The second end 3334 of the second aperture 3326 may be hexagonal to mate with the shape and size of the shaft 3324. A shoulder 3335 may be present in a central area of the second aperture 3326. The shoulder 3335 may be clamped between the shaft 3324 and head 3341 of the fourth fastener 3336. Such a configuration may allow for the proper placement and secure retention of the shaft 3324 relative to the slidable bracket 3308. Other configurations may be equally appropriate and may be contemplated and implemented by a person of ordinary skill in the art without undue experimentation.

After the shaft 3324 and the slidable bracket 3308 are assembled, a leg assembly 3800 may then be slid onto the shaft 3324. As will become apparent to a person of ordinary skill in the art after the description below, it is possible for the leg assembly 3800 and the shaft 3324 to be pre-assembled, then attached to the slidable bracket 3308 if desired by a particular user. Such an assembly process may be desirable if the assembly is moved between bicycles with a similar ring and chain configuration but may be used at any time.

As may initially be apparent from FIG. 6, the assembly 3300 and the leg assembly 3800 may include an inboard leg 3900 and an outboard leg 4000 that slidingly engage and mate with one another. In many embodiments, the leg assembly 3800 may be assembled separately and slid onto the shaft 3324. In other embodiments, the inboard leg 3900 may be slid onto the shaft 3324, and then the outboard leg 4000 may be engaged with the inboard leg 3900 to form the leg assembly 3800.

Figure 28:
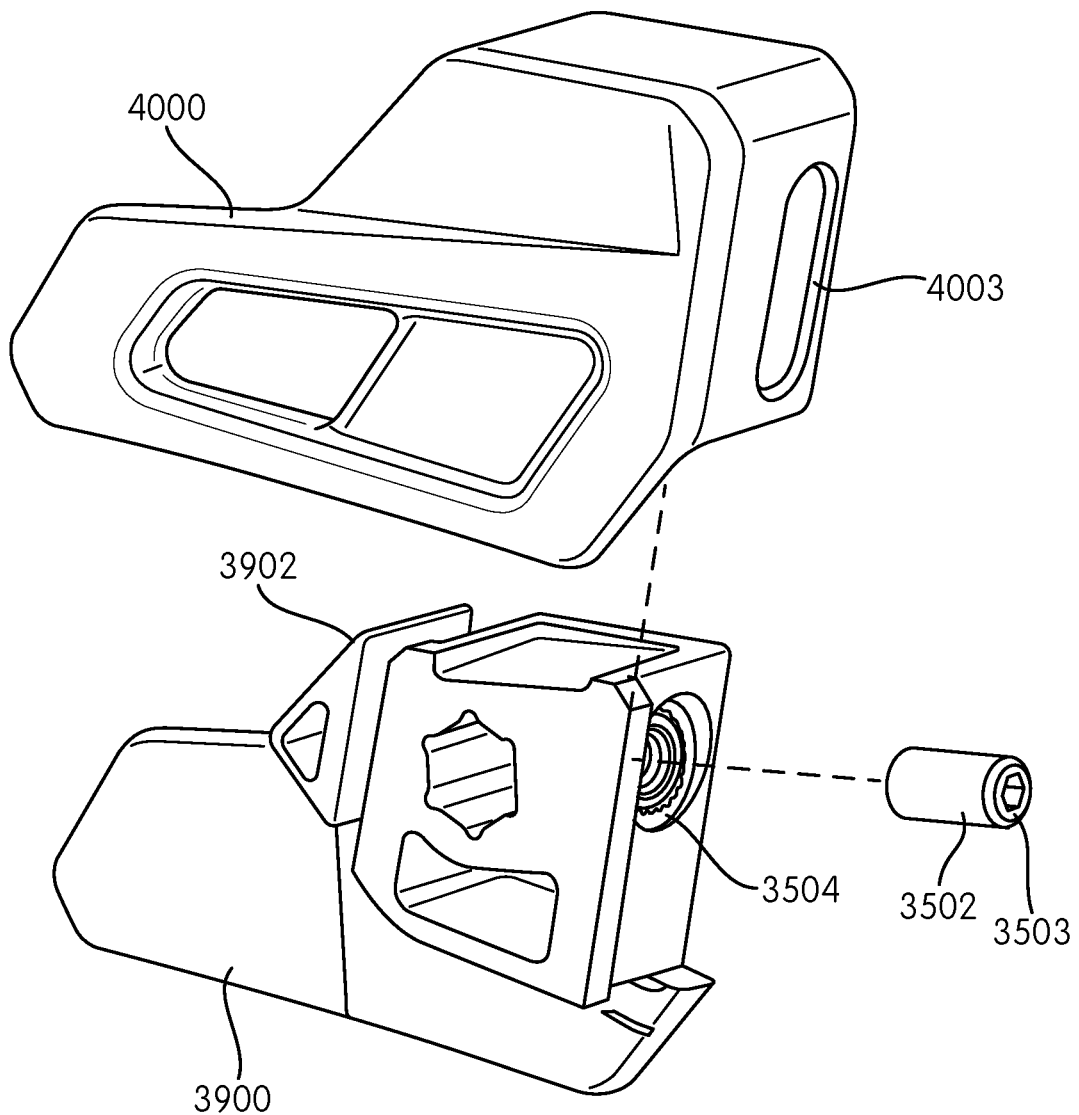
FIG. 28 is an exploded view of the legs and set screw.
Figure 29:
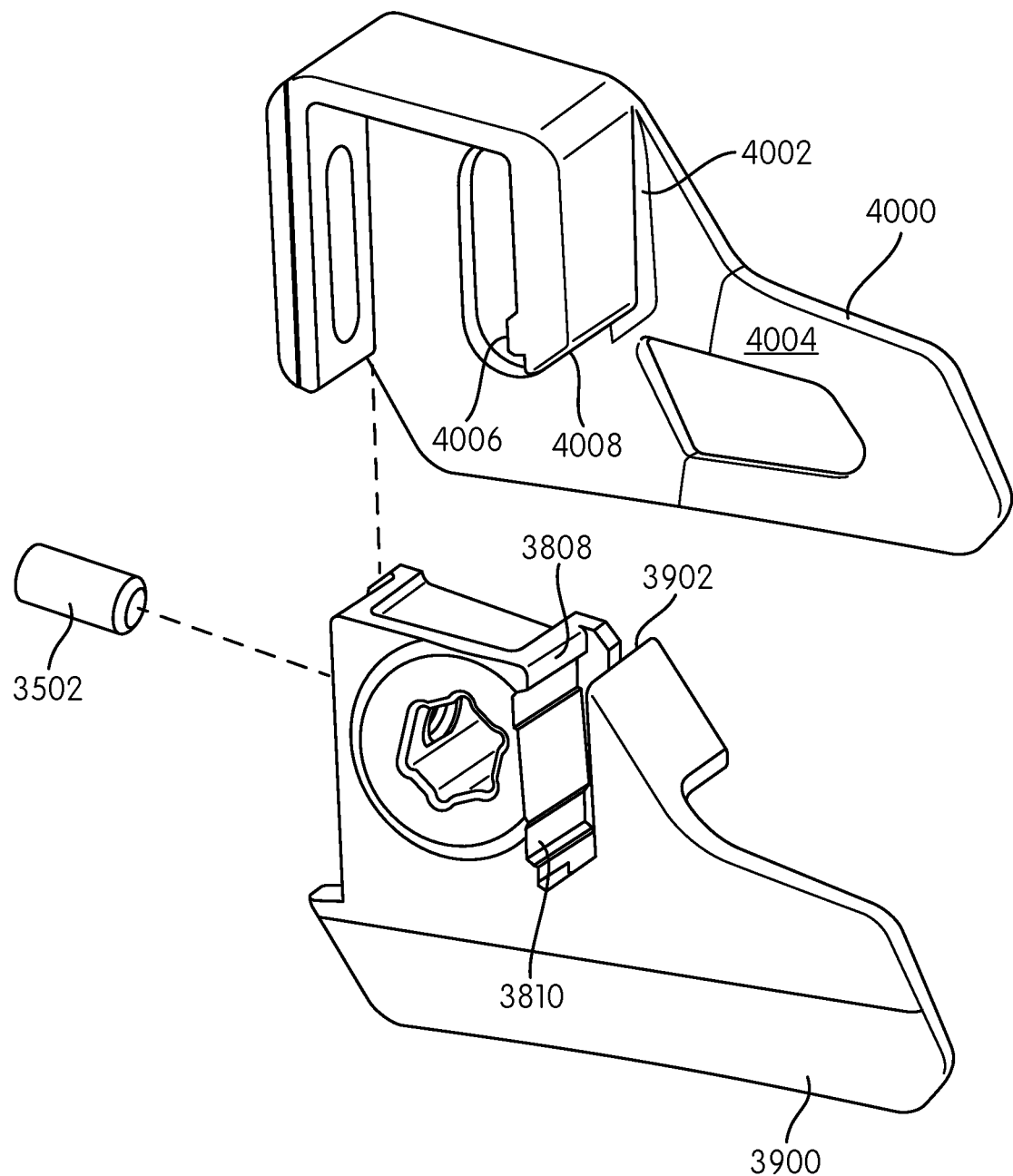
FIG. 29 is an exploded view of the legs and set screw taken in the opposite direction from FIG. 28.
Figure 30:
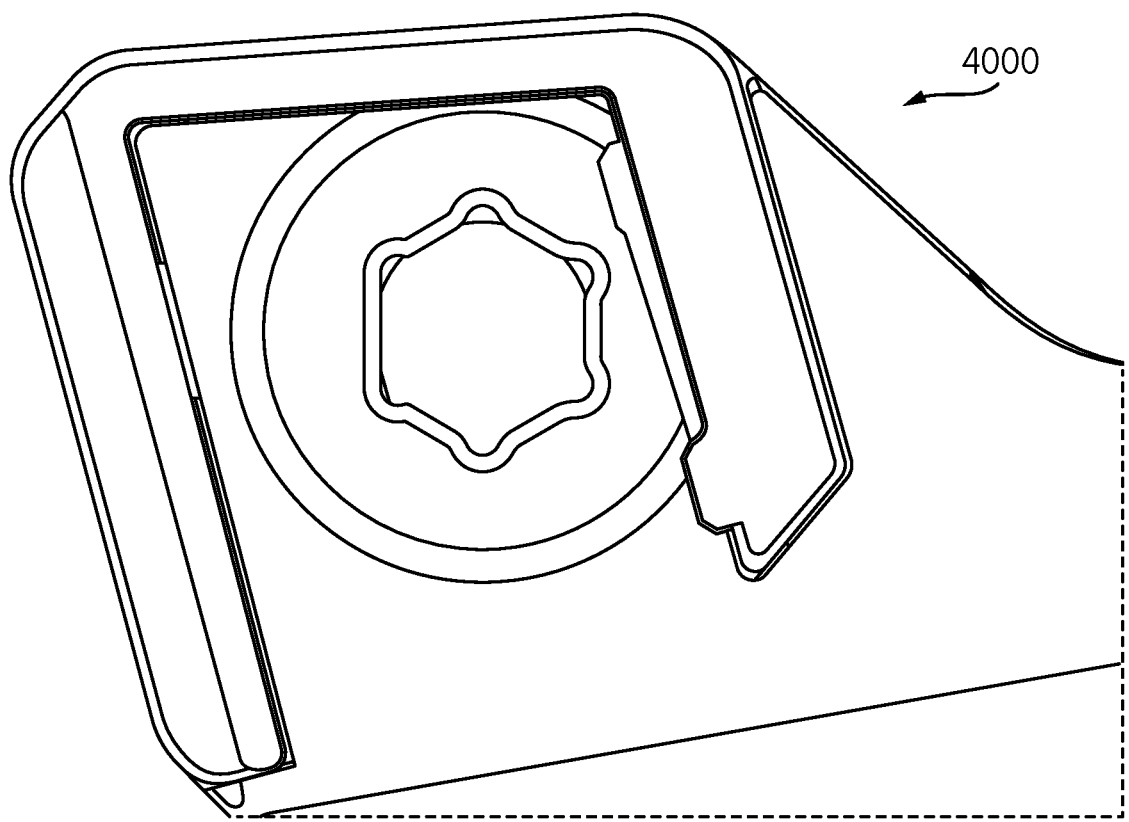
FIG. 30 is a partial cross-sectional view of the legs when the outboard leg is in a lower position taken along a line similar to 9-9 of FIG. 7.
Figure 31:
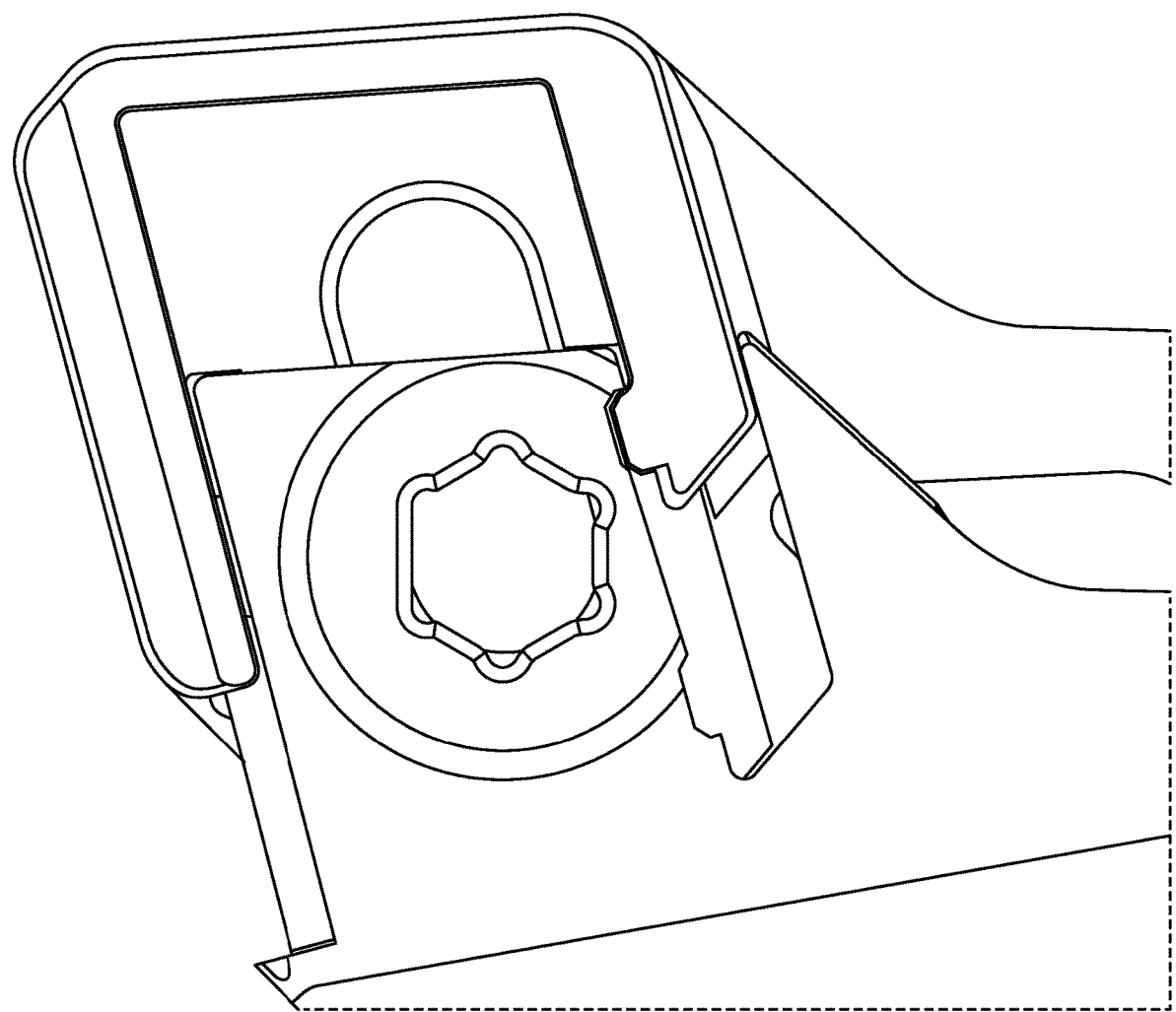
FIG. 31 is a partial cross sectional view of the legs like FIG. 30 except that the outboard leg is in an upper position.
Figure 32:
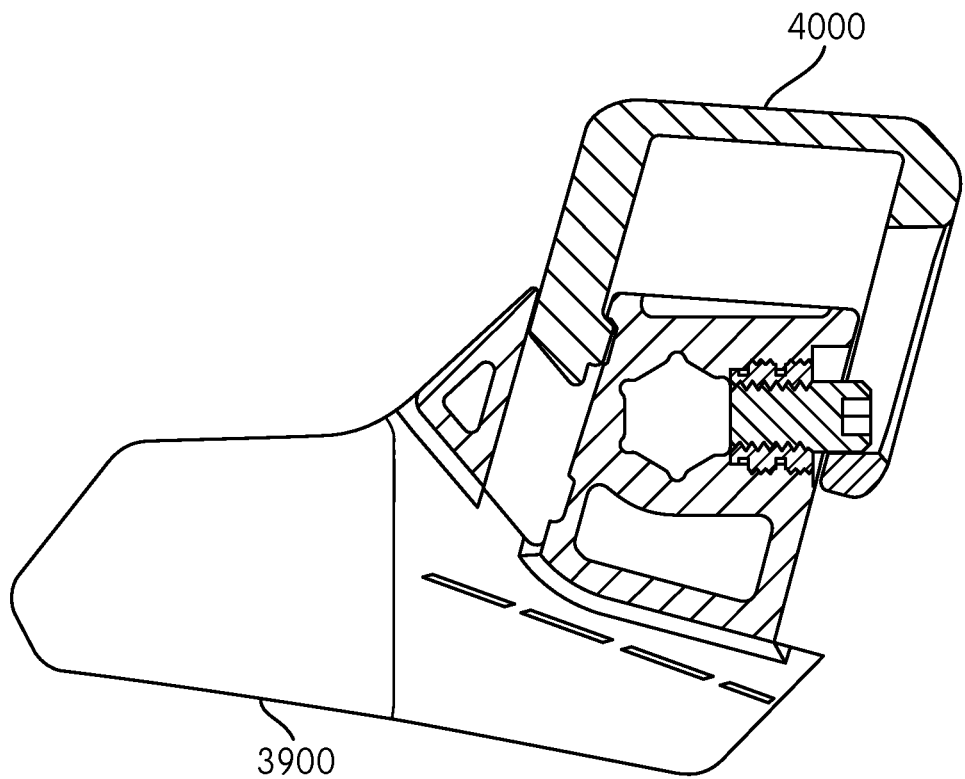
FIG. 32 is a cross-sectional view of the legs taken along line 12-12 of FIG. 7 with the outboard leg in the upper position.
Figure 33:
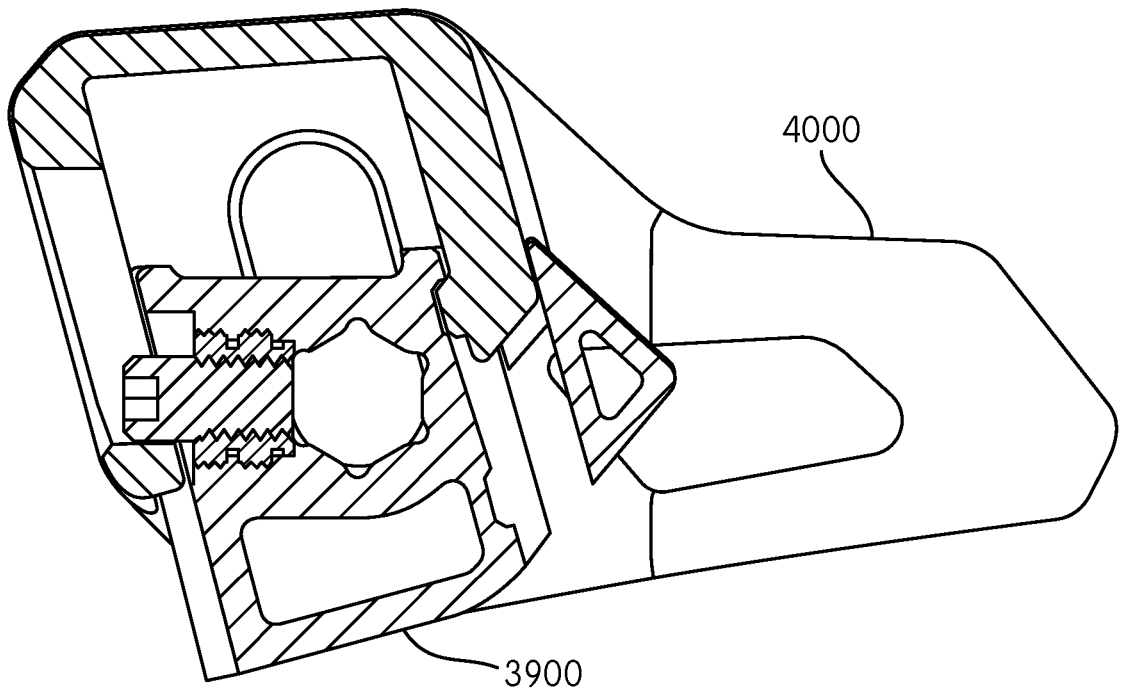
FIG. 33 is a view similar to FIG. 32 but taken along line 14-14 of FIG. 7.
Figure 34:
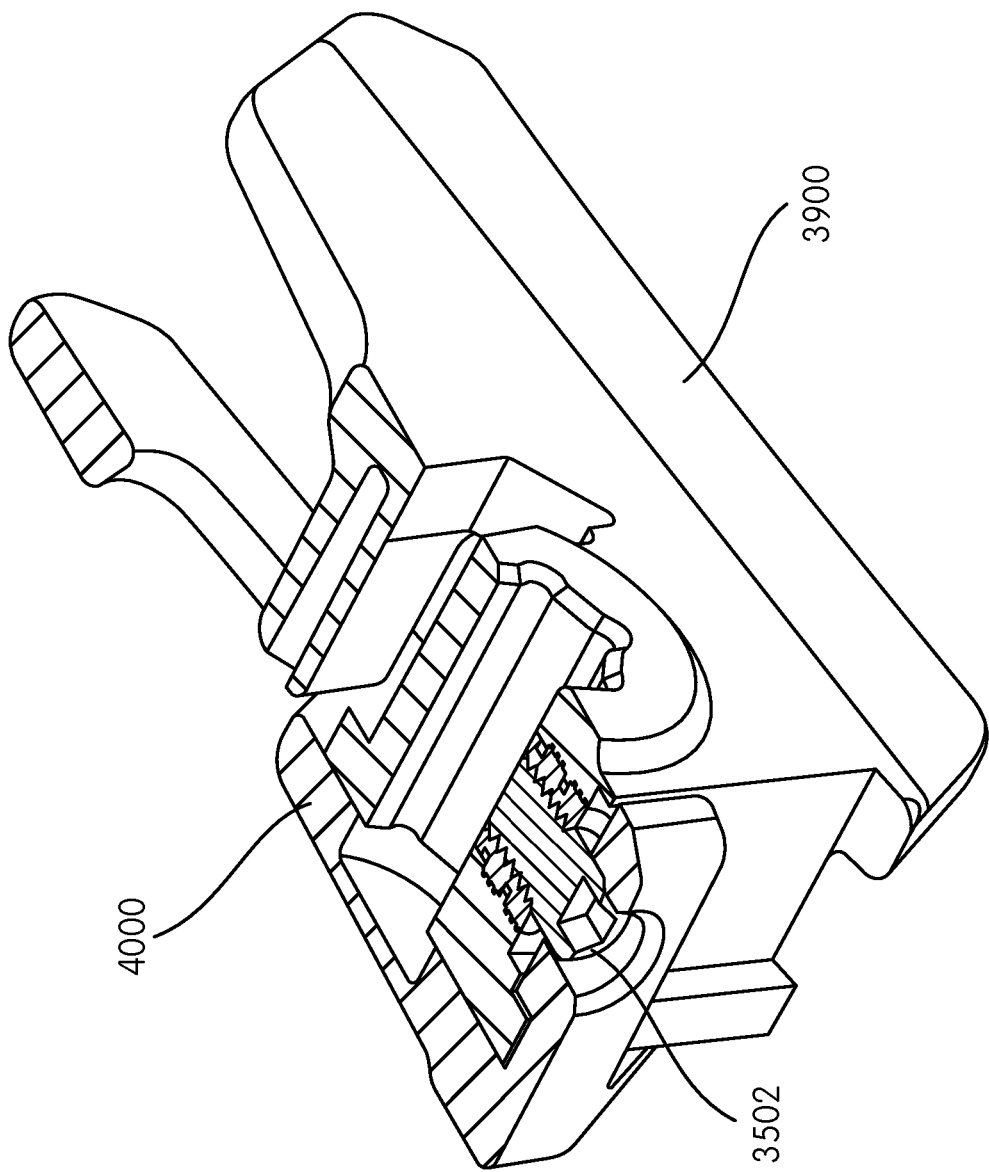
FIG. 34 is a perspective view of the view of FIG. 26.

As may best be seen in a comparison of FIGS. 28 and 29, the inboard leg 3900 and the outboard leg 4000 may be removably secured to one another through the use of corresponding mating portions. The inboard leg 3900 may include a first mating portion 3902. In the embodiment shown, the first mating portion 3902 may include at least one groove. In many embodiments, it may be desirable for the first mating portion 3902 to be integrally formed with the inboard leg 3900.

The assembly may also include an outboard leg 4000. The outboard leg 4000 may include a second mating portion 4002 that may extend from an outboard leg face 4004. In the embodiment shown, the second mating portion 4002 may comprise one or more fingers or projections 4006 extending outwardly from an outer end 4008 of the second mating portion 4002. In many embodiments, it may be desirable for the second mating portion 4002 to be integrally formed with the outboard leg face 4004. In many embodiments, the second mating portion 4002 may be made of a material that allows the second mating portion 4002 to be slightly flexible, so that it may be deformed slightly as will be discussed in greater detail below.

Figure 26:
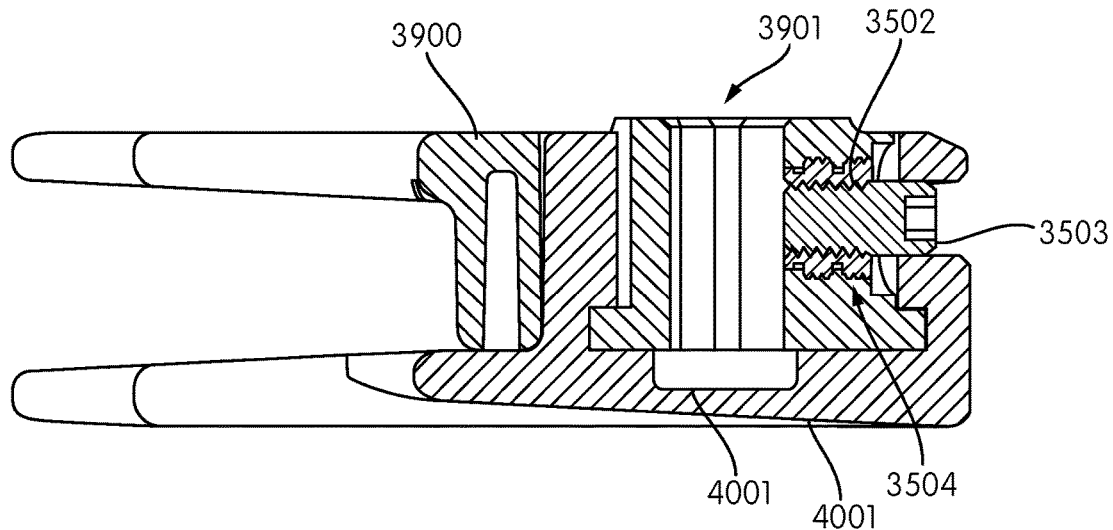
FIG. 26 is a cross-sectional view of just the legs and set screw taken along line 26-26 of FIG. 16.
Figure 27:
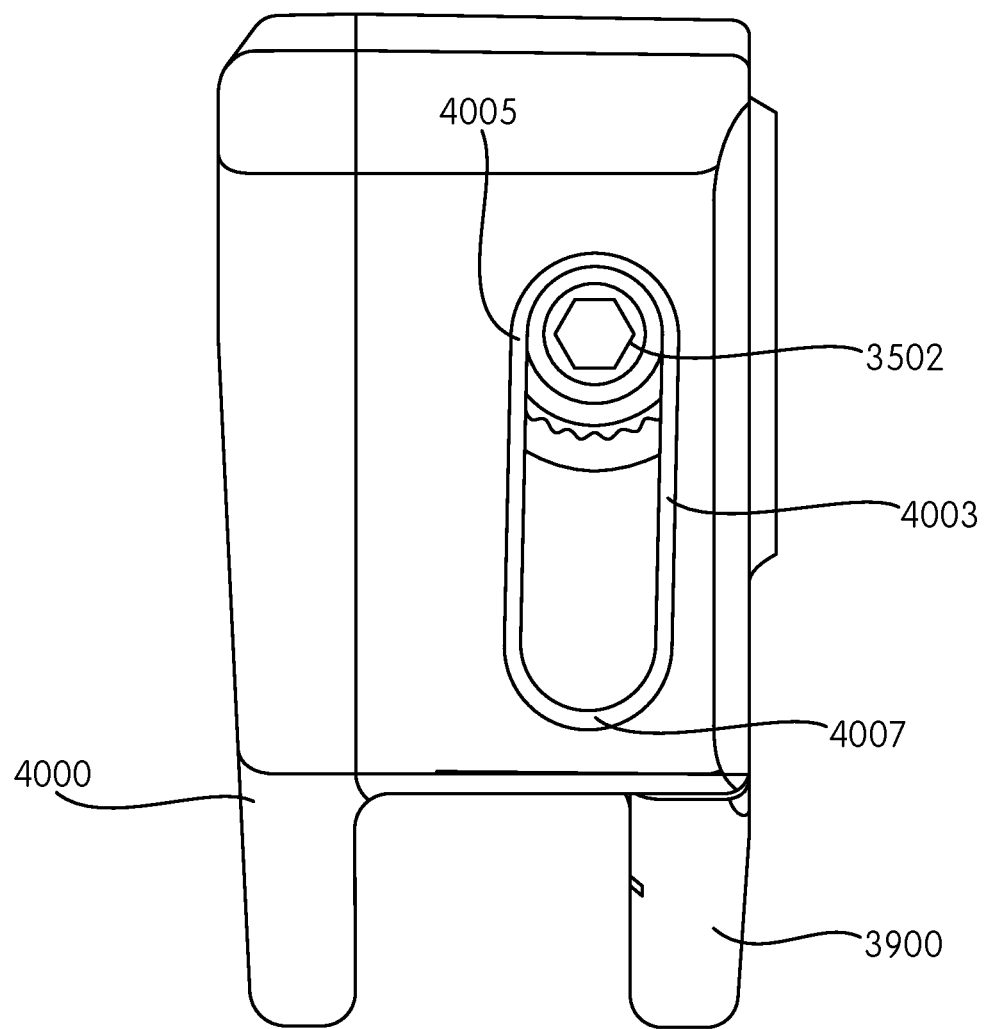
FIG. 27 is a front view of the assembly with the outboard leg in the lower position.

As may be best seen in FIG. 26, the inboard leg 3900 may include a first inboard leg aperture 3901 configured to allow the shaft 3324 (not shown in this FIG.) to pass therethrough. The outboard leg 4000 may include a first outboard leg aperture 4001 that may allow the shaft 3324 to pass at least partially therethrough.

The inboard leg 3900 and the outboard leg 4000 may interfitted or substantially secured to one another laterally without being attached to the remainder of the structure 3300. This interfitting may be understood most clearly in an examination of FIGS. 28 and 29. In the illustrated embodiment, the inboard leg 3900 and the outboard leg 4000 may be positioned adjacent one another so that the first mating portion 3902 and the second mating portion 4002 are positioned adjacent one another. The outboard leg 4000 may be moved downwardly relative to the inboard leg 3900. The inboard leg 3900 may be moved upwardly relative to the outboard leg 4000. A user may choose to hold one of the legs 3900, 4000 in a single position and move the other leg, or the user may move both legs simultaneously, as the user prefers. When the legs are brought together, the second mating portion 4002, in particular the finger 4006, may deform slightly outwardly. A taper, such as the angled portion 3803, on the first mating portion 3902 may create an outward pressure on the second mating portion 4002 and an inward pressure on the first mating portion 3902. This relative pressure may allow the second mating portion 4002 to be deformed or deflected and become inserted into the first mating portion 3902. In many embodiments, the first mating portion 3902 may include a secondary groove or recess 3810, best seen in FIG. 12 that is at least as wide as a corresponding finger 4006 on the second mating portion 4002. The correspondence in shape and size between the finger 4006 and the groove 3810 may allow the second mating portion 4002 to return to its non-deformed configuration. This may be referred to as a "snap fit" configuration, and this type of configuration is well known to designers of this type of product. When the finger 4006 enters the groove 3810, the inboard leg 3900 and the outboard leg 4000 are substantially secured to one another. Such a design is configured to allow the engagement of the inboard leg 3900 and the outboard leg 4000, but not to easily permit the removal of the two legs from one another.

Figure 12:
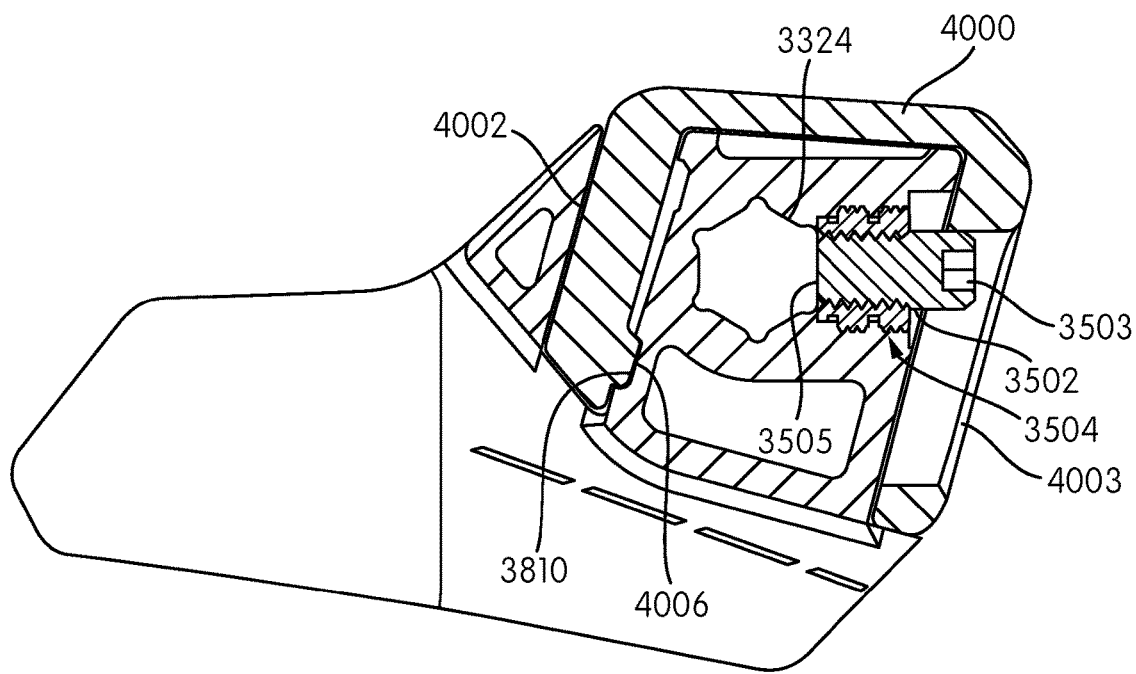
FIG. 12 is a cross-sectional view of the legs taken along line 12-12 of FIG. 7 with the outboard leg in the lower position.
Figure 25:
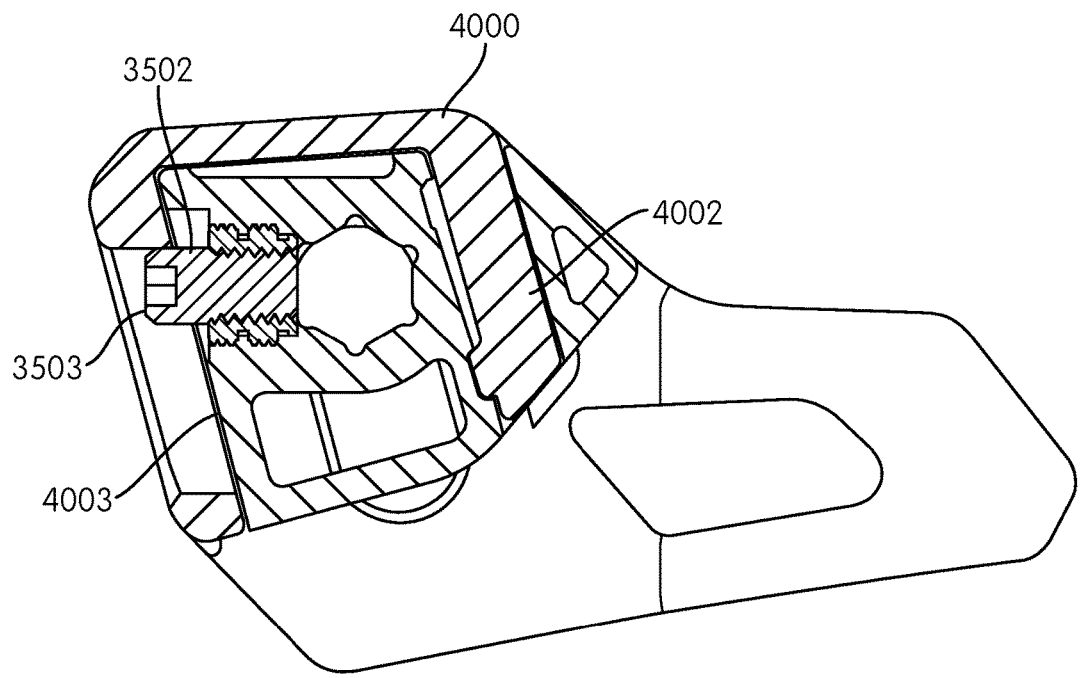
FIG. 25 is a view similar to FIG. 24 but taken along line 14-14 of FIG. 7.

After the inboard leg 3900 and the outboard leg 4000 are substantially secured to one another, they may be interfitted with the remainder of the assembly. The assembled legs 3800 may be placed onto the shaft 3324 and secured laterally in place with a fifth fastener 3502. In some embodiments, the inboard leg 3900 may include a second inboard leg recess 3504, which may be a threaded recess, that may allow the fifth fastener 3502 to engage the assembled legs 3800 and the shaft 3324. In the illustrated embodiment, the threaded recess 3504 is defined within the inboard leg 3900. In many embodiments, the fifth fastener 3502 may include a conventional hex recess 3503 to allow a user to tighten the fifth fastener 3502 with a conventional hex wrench. The rotation of the fifth fastener 3502 may cause a first end 3505 of the fifth fastener 3502 to contact the shaft 3324, and thereby may secure the assembled legs 3800 in a lateral position relative to the first bracket 3302 as desired by the user. This configuration is best seen in FIGS. 12, 25, and 26. In a preferred embodiment, the fifth fastener 3502 may be a M4 set screw.

The outboard leg 4000 may include a second outboard leg recess 4003 that may allow the fifth fastener 3502 to pass therethrough. In some embodiments, the second outboard leg recess 4003 may be vertically elongated and may be configured to allow the fifth fastener 3502 to pass through the outboard leg recess 4003 at any position along its length.

After the legs 3900 and 4000 have been assembled into the assembled legs assembly 3800, the legs 3900 and 4000 are able to move or slide vertically relative to one another, even though they are substantially fixed laterally, rotationally, and horizontally to one another. The second leg 4000 is also configured to be vertically slidable relative to the remainder of the assembly 3300, while the first leg 3900 remains relatively fixed vertically relative to the assembly 3300. As noted in connection with other FIGS., the entire leg assembly 3800 is vertically adjustable relative to the fixed bracket 3302 by the vertical adjustment of the slidable bracket 3308. The leg assembly 3800 is laterally adjustable relative to the remainder of the assembly 3300 using the fifth fastener 3502 and the shaft 3324. The leg assembly 3800 and the shaft 3324 are rotationally adjustable relative to the remainder of the assembly using the fourth fastener 3336.

Figure 5:
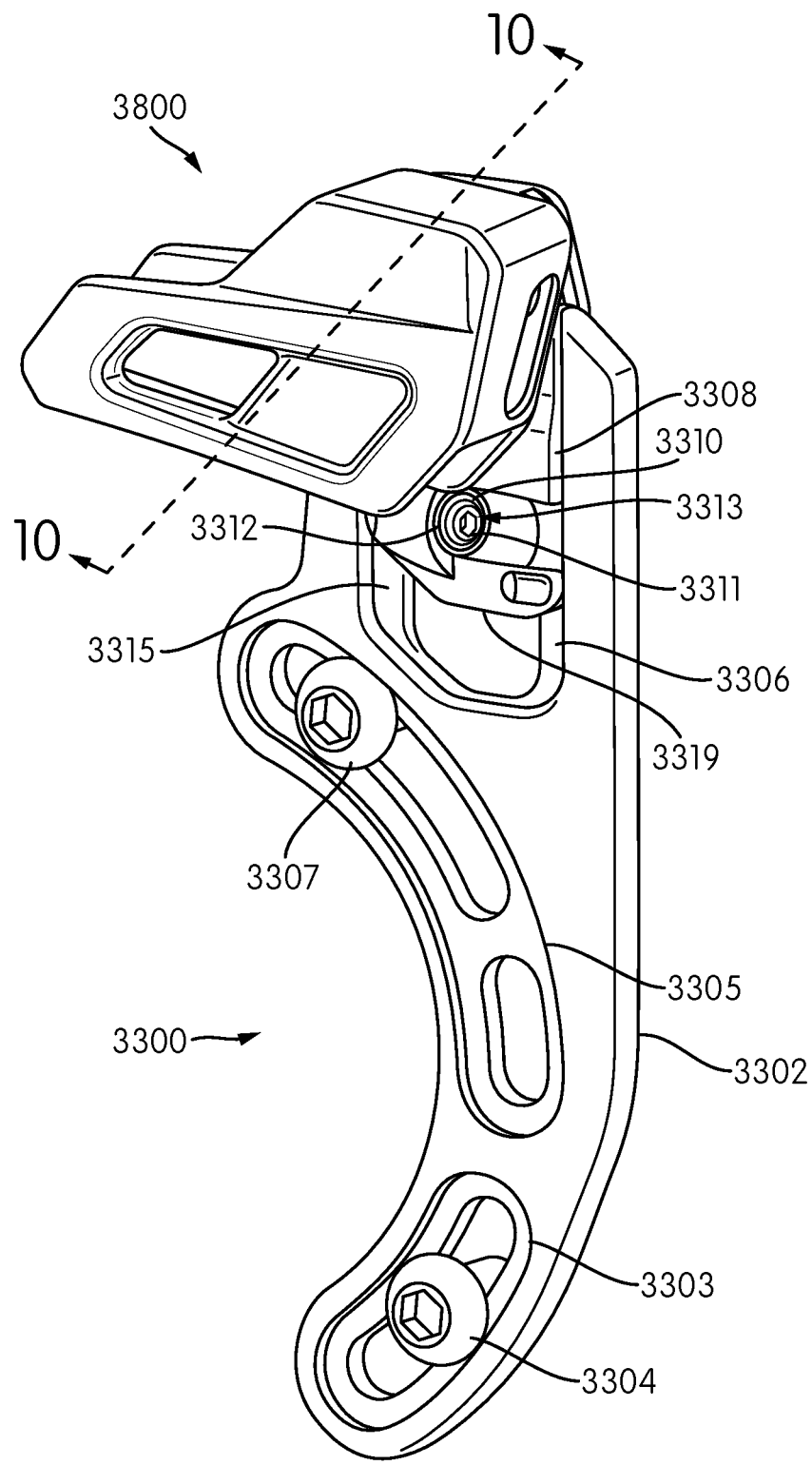
FIG. 5 is a perspective view of an embodiment of an assembly according to the disclosure with an outboard leg in a lower position.
Figure 11:
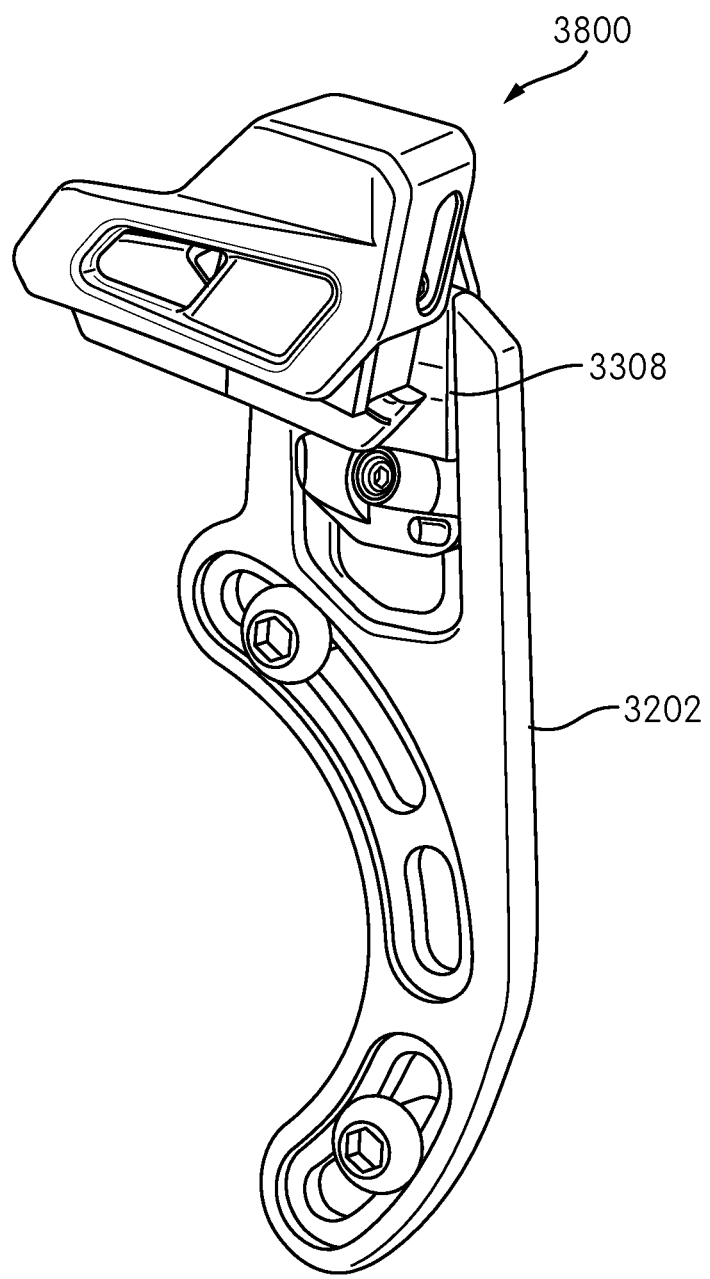
FIG. 11 is a perspective view of the assembly of FIG. 5 with the outboard leg in an upper position.
Figure 13:
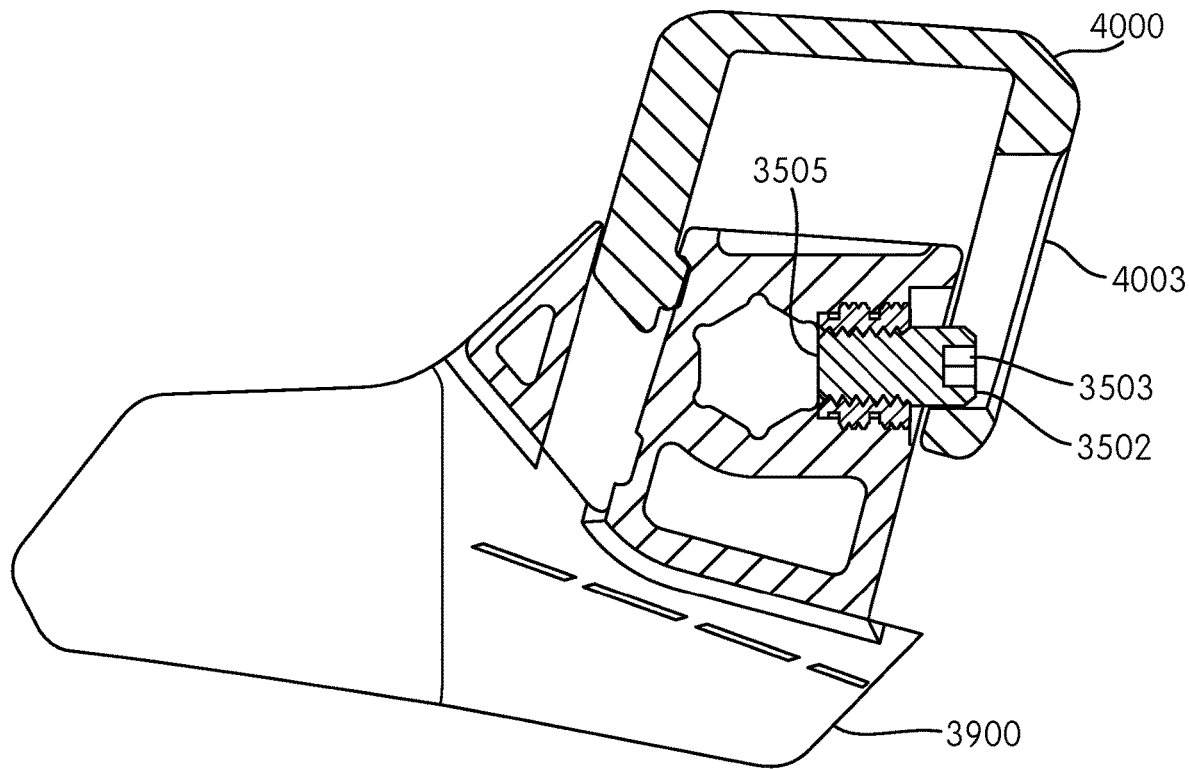
FIG. 13 is a cross-sectional view of the legs taken along line 12-12 of FIG. 7 with the outboard leg in the upper position.
Figure 14:
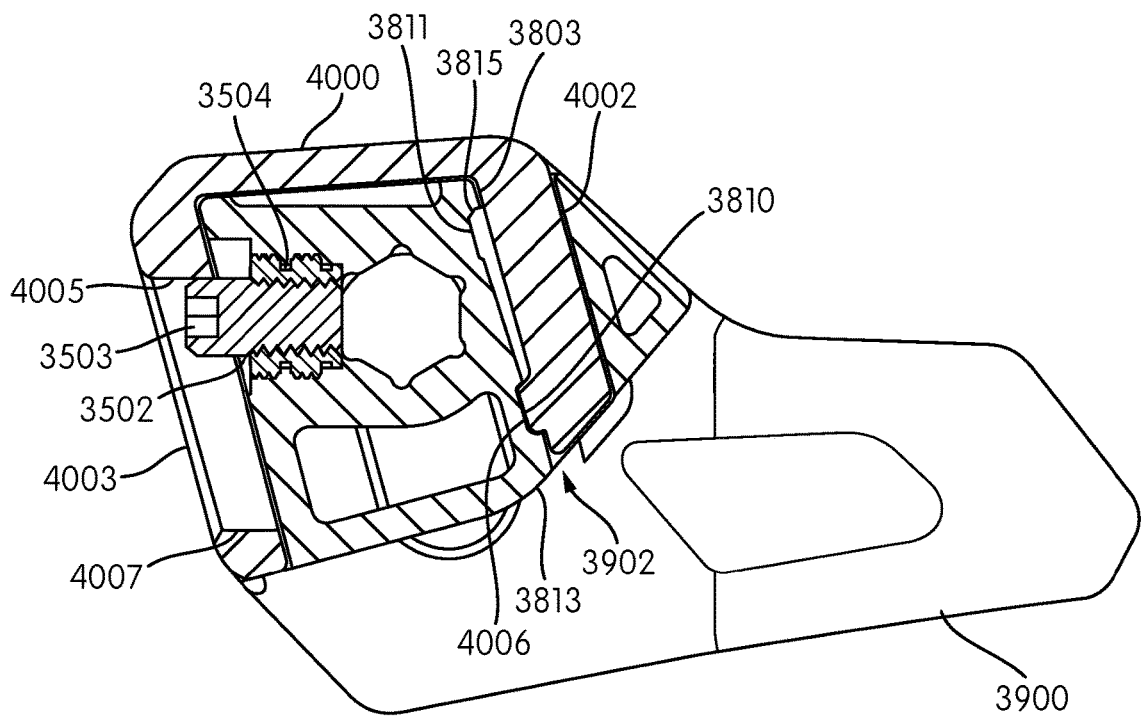
FIG. 14 is a cross-sectional view of the legs taken along line 14-14 of FIG. 7 with the outboard leg in the lower position.
Figure 15:
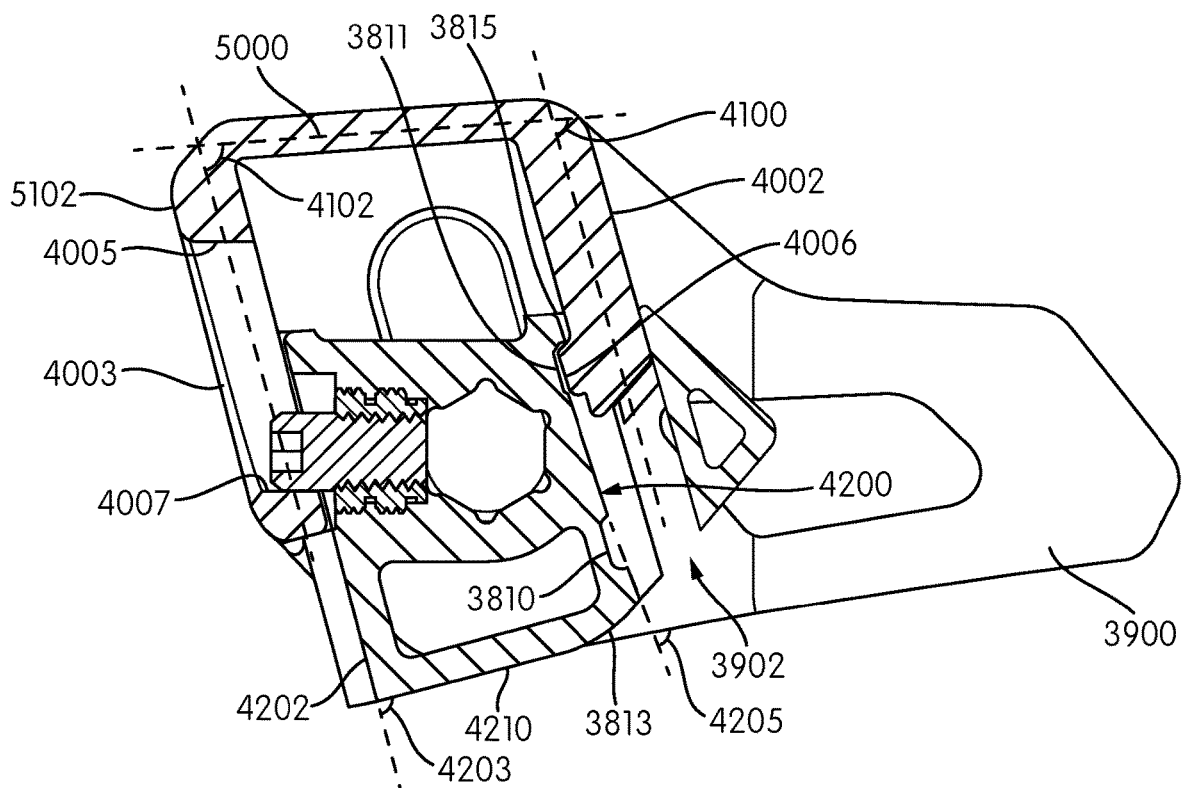
FIG. 15 is a cross-sectional view of the legs taken along line 14-14 of FIG. 7 with the outboard leg in the upper position.
Figure 16:
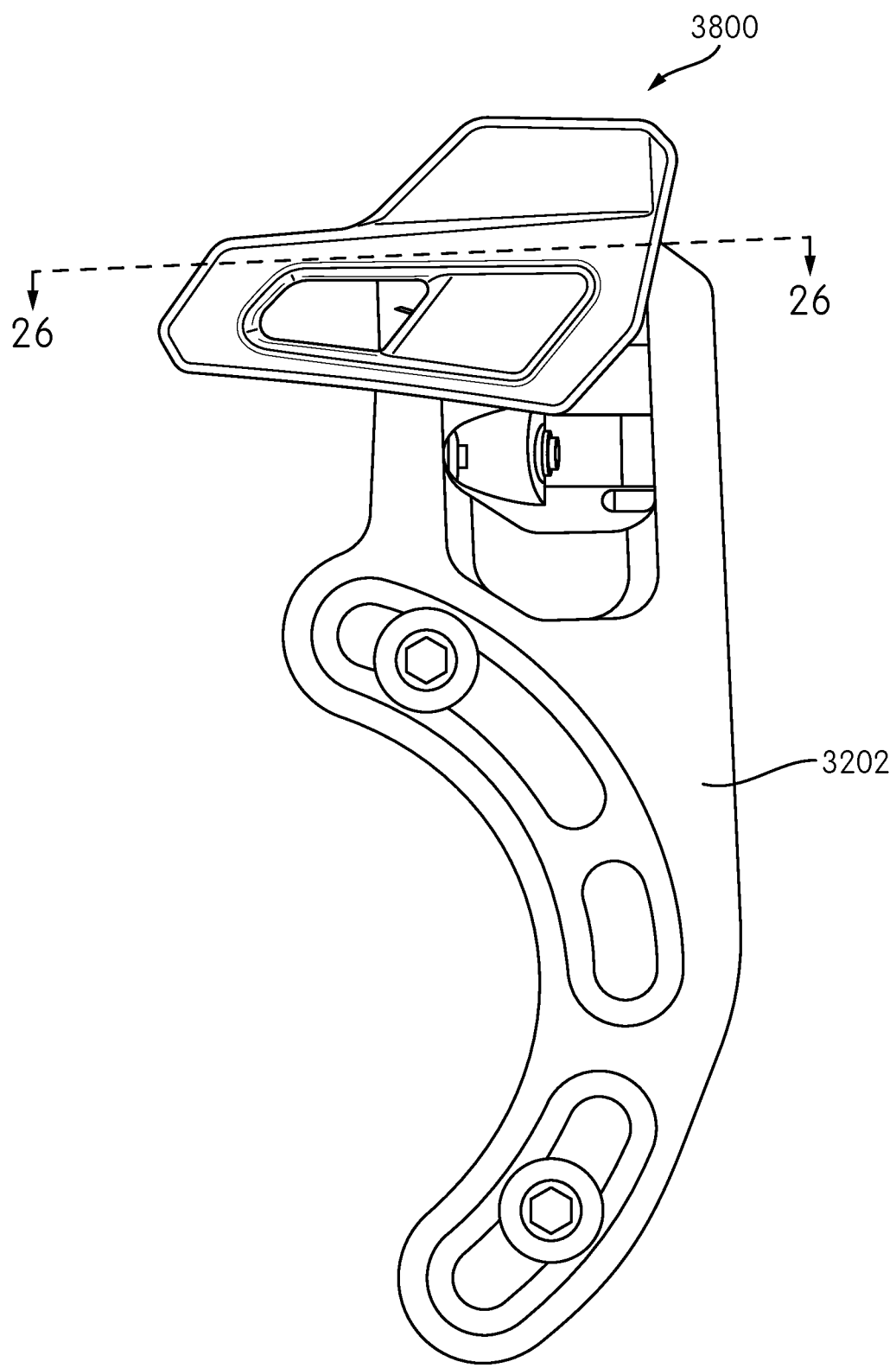
FIG. 16 is a side view of the assembly.
Figure 17:
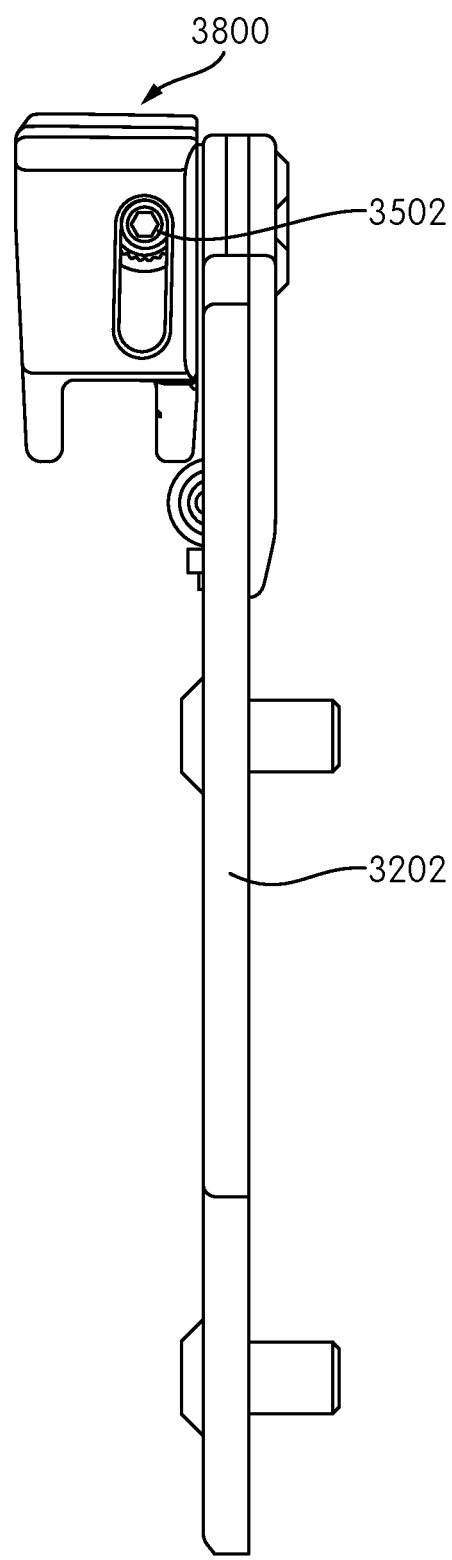
FIG. 17 is a front view of the assembly.
Figure 18:
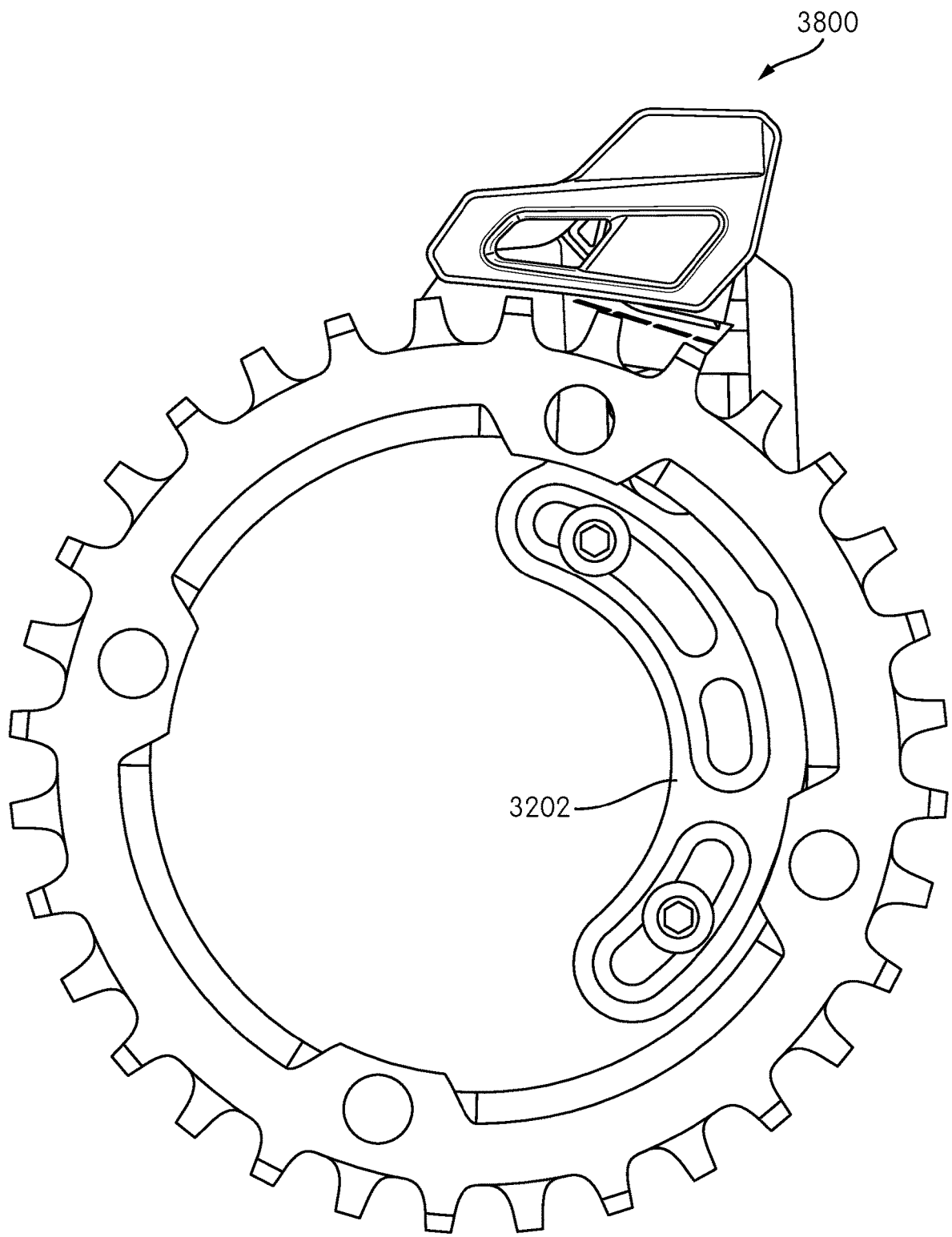
FIG. 18 is a side view of the assembly with the outboard leg in the outboard position shown as the assembly would be adjacent a representative chain ring.
Figure 19:
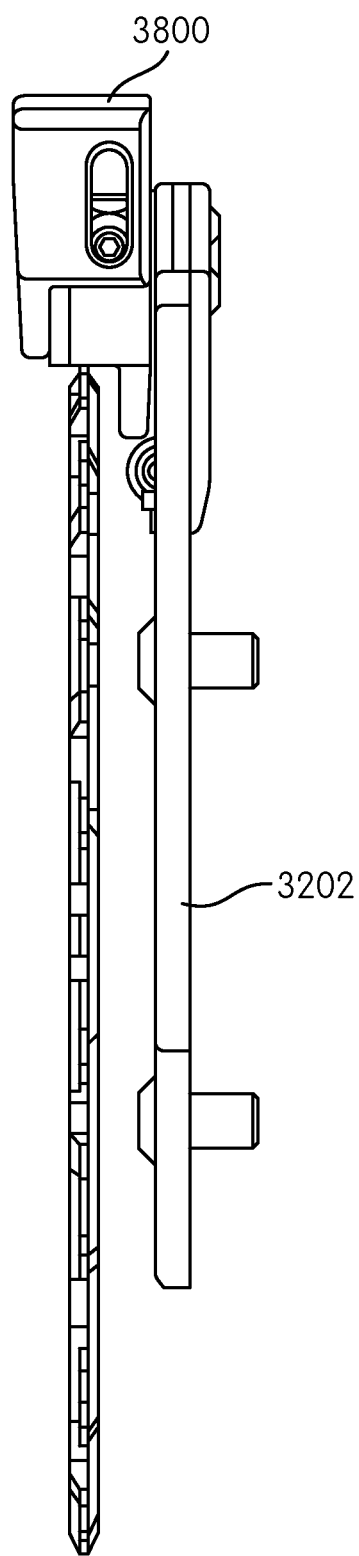
FIG. 19 is a front view of the parts shown in FIG. 18.
Figure 20:
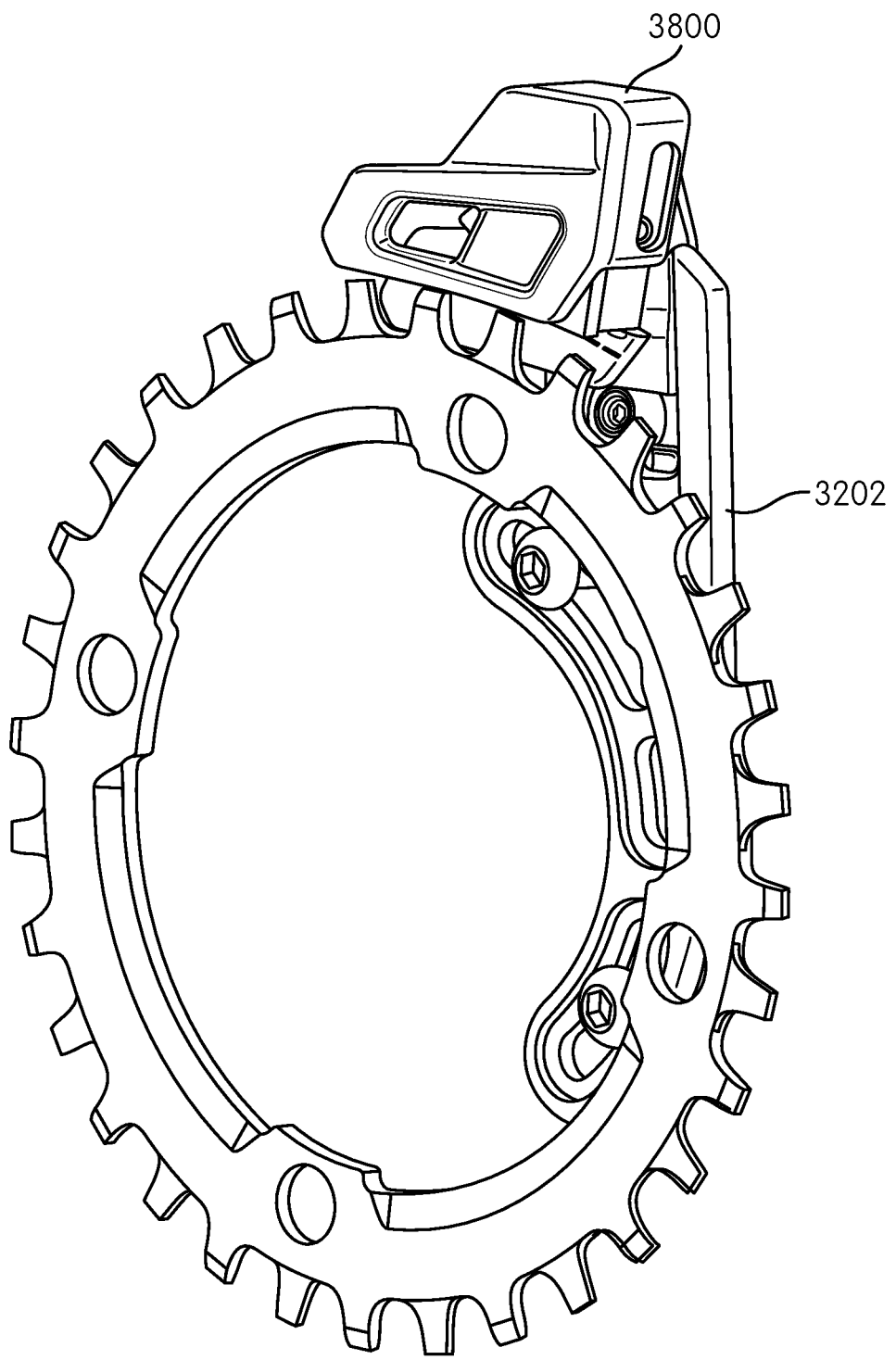
FIG. 20 is a perspective view of the parts of FIG. 18.
Figure 21:
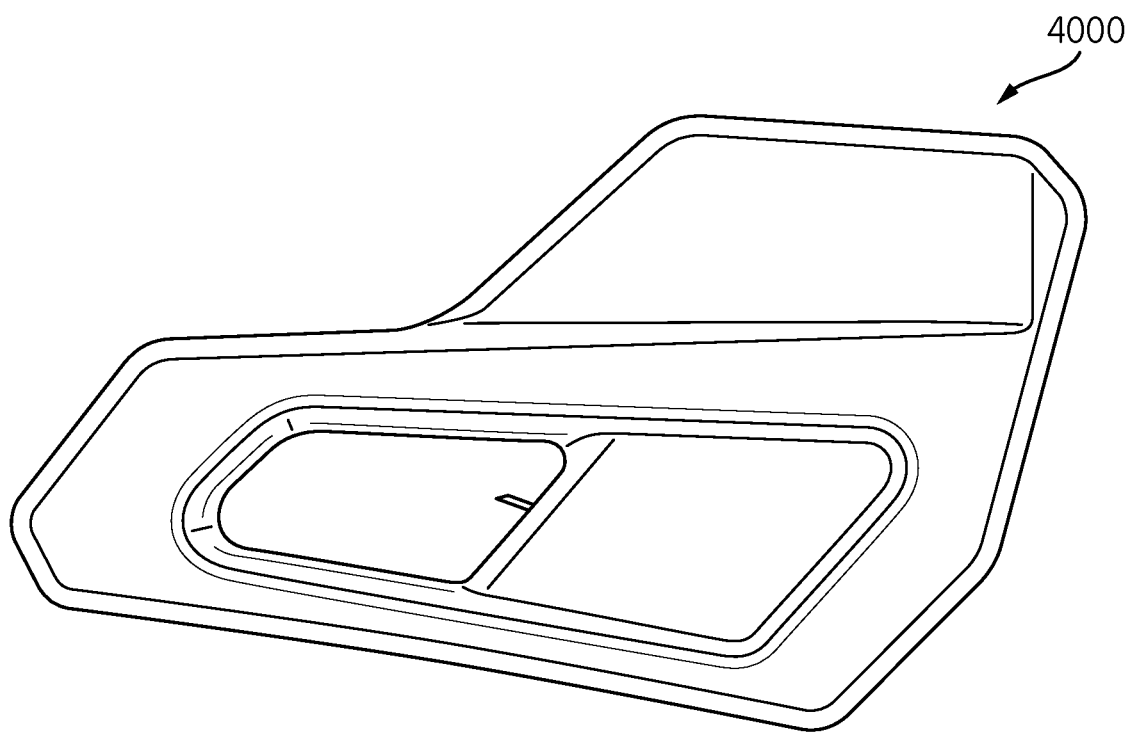
FIG. 21 is a side view of one embodiment of the guide.
Figure 22:
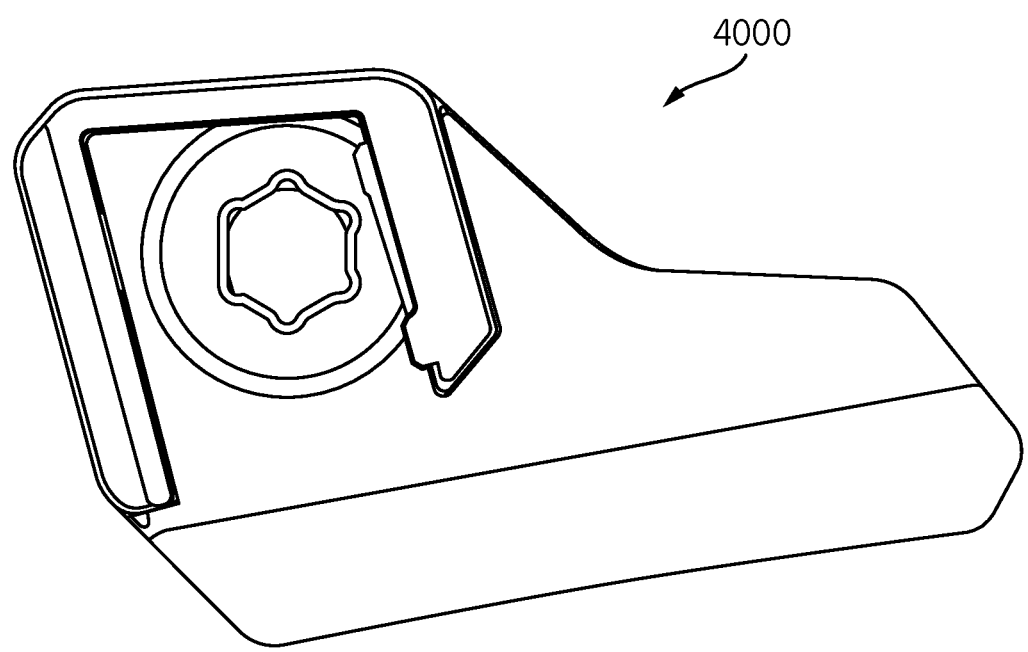
FIG. 22 is a partial cross-sectional view of the legs when the outboard leg is in a lower position taken along line 9-9 of FIG. 7.
Figure 23:
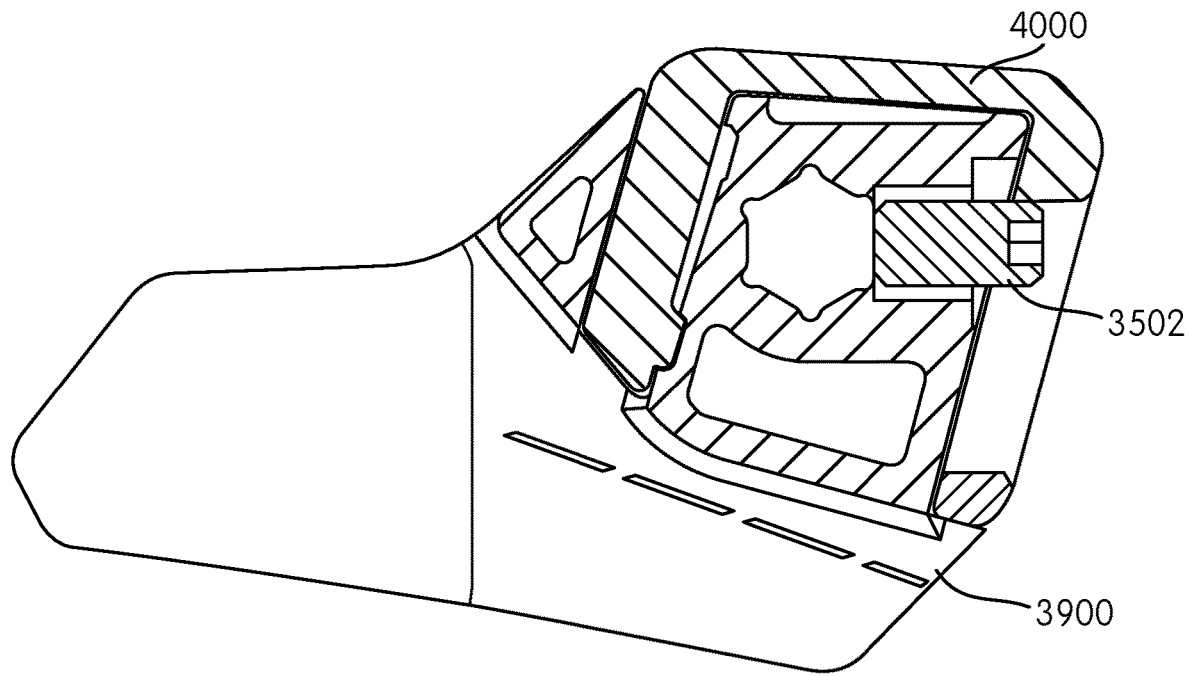
FIG. 23 is a cross-sectional view of the legs taken along line 12-12 of FIG. 7 with the outboard leg in the lower position.
Figure 24:
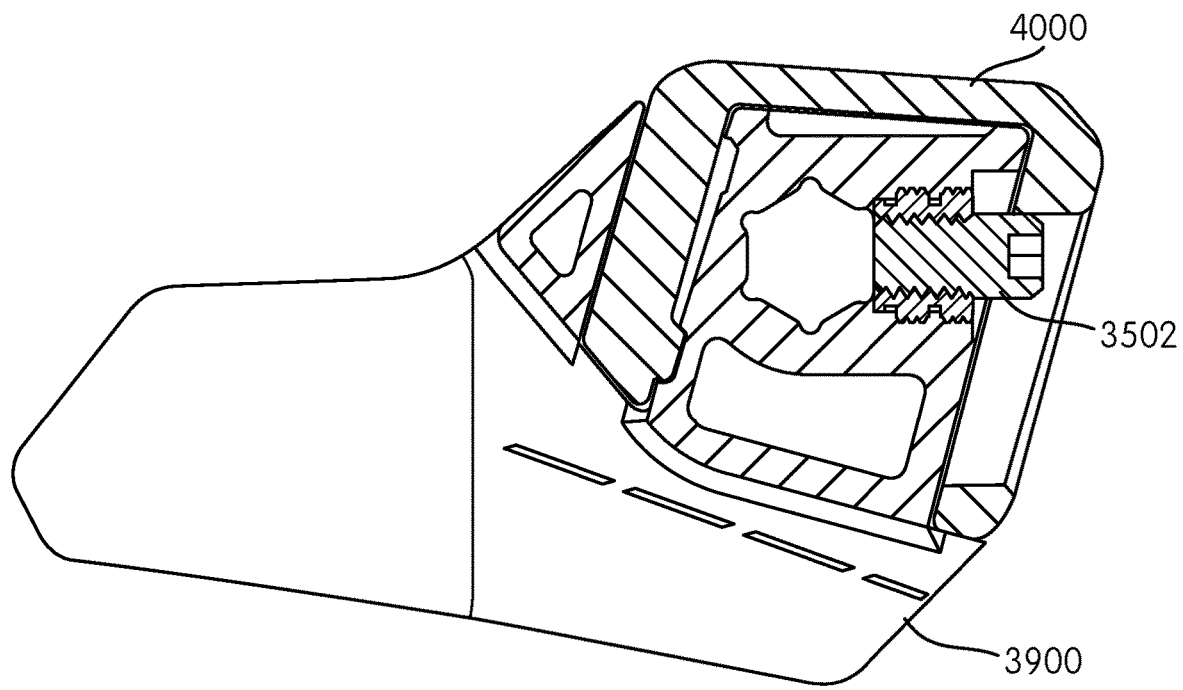
FIG. 24 is a view similar to FIG. 23, but detailing the structure of the set screw.

In some embodiments, it may be desirable to include corresponding features that define the extent to which the outboard leg 4000 may slide relative to the inboard leg 3900. A comparison of various FIGS. shows the relative position of the inboard leg, the outboard leg, and the mating portions in various configurations. FIGS. 5, 12, and 14 show the relative positions when the outboard leg is in a first, lower position. FIGS. 11, 13, and 15 show the relative positions when the outboard leg is in a second, upper position.

When a user wishes to move the outboard leg 4000 out of the way in order to do something with the chain or chain ring, the user may grasp the outboard leg 4000 and slide the outboard leg 4000 upwards by applying upward force manually. This movement may move the finger 4006 within the groove 3902 from the position shown in FIGS. 5, 27, 12, 14 to the position shown in FIGS. 11, 7, 13, 15.

Figure 35:
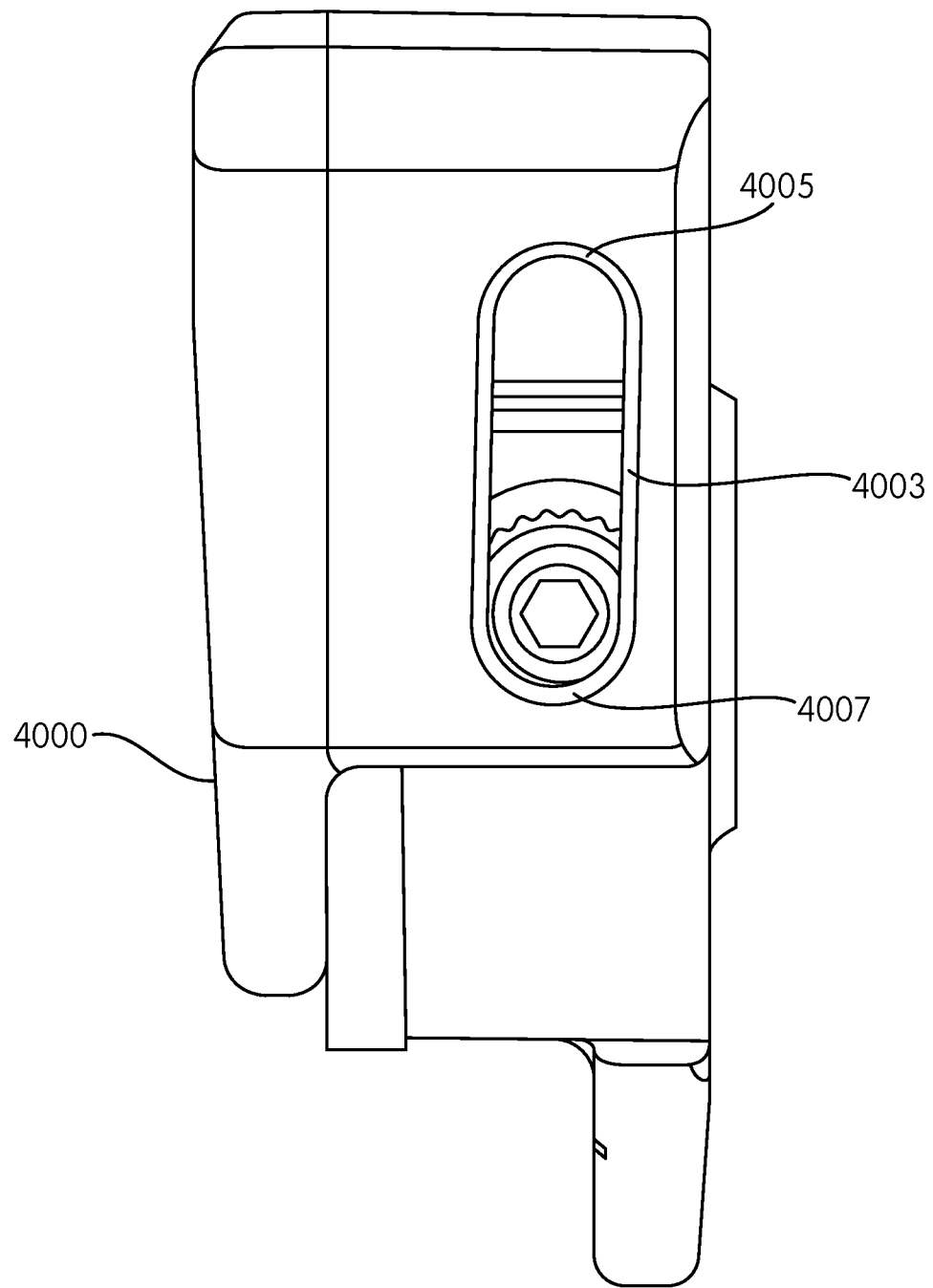
FIG. 35 is the view of FIG. 27 with the outboard leg in the upper position.

The set screw or other fifth fastener 3502 previously described as releasably fixing the leg assembly 3800 to the shaft 3224 may also be used as a stop to help to govern the upper and lower extreme positions available to the outboard leg 4000 in addition to the tactile feel of the finger 4006 within the groove 3902. This may be best seen in a comparison of FIG. 27 (showing the fifth fastener 3502 relative to the second outboard leg aperture 4003 in a lower position) and FIG. 35 (showing the fifth fastener 3502 relative to the second outboard leg aperture 4003 in an upper position). When the user slides the outboard leg 4000 upwardly, the set screw 3502 may contact the lower edge 4007 of the elongated second outboard leg aperture 4003 and may restrict further movement of the outboard leg 4000 in an upward direction. Similarly, when the user slides the outboard leg downwardly, the set screw 3502 may contact the upper edge 4005 of the second outboard leg aperture 4003 and may restrict further movement of the outboard leg 4000 in a downward direction.

In some embodiments, it may be desirable to create additional frictional forces to encourage the outboard leg 4000 and the inboard leg 3900 to remain locked in position. This may be best seen in FIGS. 14 and 15. FIG. 15 illustrates the outboard leg 4000 in a raised position relative to the inboard leg 3900. FIG. 14 illustrates the outboard leg 4000 in a lowered position relative to the inboard leg 3900. As mentioned above, the locking finger or tooth 4006 on the second mating portion 4002 is deformed by the angled portion 3803 on the first mating portion 3902 when the first mating portion 3902 and the second mating portion 4002 are placed in position relative to one another. Once the locking tooth 4006 passes the angled portion 3803 and is no longer deformed, removal of the outboard leg 4000 from the inboard leg 3900 may be difficult or impossible. The locking tooth 4006 may be designed so that it encourages or forces the outboard leg 4000 and the inboard leg 3902 to be slidingly engaged in a non-removable way once they are first engaged. The first mating portion 3902 may include a first recess 3810 near a first end 3813 of the first mating portion and a second recess 3811 near a second end 3815 of the first mating portion 3902. The locking tooth 4006 may first engage the upper recess 3811. However, the locking tooth 4006 may be designed to allow the locking tooth to slide along the first mating portion 3902 to the lower recess 3810. A user is thereby provided with a visual indicator of when the outboard leg is in its extreme upward and downward position, by looking at the position of the set screw 3502 within the slot 4003, and by a tactile indicator provided by the tooth 3812 entering the first recess 3811 and the second recess 3810. In some embodiments, movement of the outboard leg 4000 relative to the inboard leg 3900 may be further resisted by the addition of resistance. In some embodiments, the angle 4100 of the second mating portion relative to the top 5000 of the outboard leg 4000 may differ somewhat from the angle 4102 of the front face 5102 of the outboard leg relative to the top 5000 of the outboard leg. The difference between the angles 4100 and 4102 may create additional friction and may serve as an additional force to encourage the tooth 3812 to remain in one or the other of the grooves 3810 and 3811. In addition, if desired the angle 4203 of the front face 4202 of the inboard leg relative to the bottom 4210 of the inboard leg may differ from the angle 4205 of the first mating portion 3902 relative to the bottom 4210 of the inboard leg. This difference in angle may have the same function as the angle difference noted above. In some embodiments the angles may be positioned to be substantially vertical.

In summary, the assembly 3300 may include an inboard leg 3900, an outboard leg 4000, a first mating portion 3902 on the inboard leg 3900, and a second mating portion 4002 on the outboard leg 4000. The first mating portion 3902 and the second mating portion 4002 may interfit with one another to connect the inboard leg 3900 to the outboard leg 4000. The first mating portion 3902 and the second mating portion 4002 may be configured to engage with one another by sliding the outboard leg 4000 relative to the inboard leg 3900.

At least one of the first mating portion 3902 and the second mating portion 4002 may comprise a finger. The other of the first mating portion 3902 and the second mating portion 4002 may comprise a groove. The assembly 3300 may further comprise a shaft 3324. The shaft 3324 may be configured to pass through the inboard leg 3900 and at least a portion of the outboard leg 4000. The assembly 3300 may further comprise a fastener 3502. The fastener 3502 may be configured to pass through a second aperture 4003 in the outboard leg 4003 and a second aperture 3504 in the inboard leg 3900 and to contact the shaft 3324. The second aperture in the outboard leg 4003 may be elongated. When the outboard leg 4000 is positioned in a first position, the fastener 3502 may contact a first end 4007 of the elongated second aperture 4003. When the outboard leg 4000 is positioned in a second position, the fastener 3502 may contact a second end 4005 of the elongated second aperture 4003.

In another embodiment an assembly for minimizing the disengagement of a chain from a chain ring may include an inboard leg 3900 having a first inboard leg aperture 3901 and a second inboard leg aperture 3504, an outboard leg 4000 having a first outboard leg aperture 4001 and a second outboard leg aperture 4003, a shaft 3324 configured to pass through the first inboard leg aperture 3901 and at least partially through the first outboard leg aperture 4001, and a fastener configured to pass through the second inboard leg aperture 3504 and the second outboard leg aperture 4003. The second outboard leg aperture 4003 may be elongated and the outboard leg 4000 is configured to move between a first position where the fastener 3502 contacts a first end 4007 of the second outboard leg aperture 4003 and a second position where the fastener 3502 contacts a second end 4005 of the second outboard leg aperture 4003.

The outboard leg 4000 may be configured to slide relative to the inboard leg 3900. The outboard leg 4000 may be configured to slide substantially vertically relative to the inboard leg 3900. The second elongated aperture 4003 may be oriented substantially vertically. Engagement of the fastener 3502 and the shaft 3324 may be capable of substantially restricting lateral and vertical movement of the inboard leg 3900. Engagement of the fastener and the shaft may be capable of substantially restricting lateral movement of the outboard leg 4000. The outboard leg 4000 may include a first mating portion 4002 and the inboard leg 3900 may include a second mating portion 3902. At least one of the first mating portion 4002 and the second mating portion 3902 comprises a finger. The other of the first mating portion 4002 and the second mating portion 3902 may comprise a groove.

In the disclosed embodiments, structures and apertures of various sizes and shapes were illustrated. The precise configurations of these items are shown in an illustrative fashion only. A designer can easily change the shape, size, material, number or other features of these items to achieve a particular characteristic that the designer may deem particularly desirable or helpful. These modifications are well within the knowledge of a designer having ordinary skill in the art. In addition, various embodiments may have disclosed a particular modification to a primary embodiment. A design will be able to easily understand how to incorporate multiple changes to the design as disclosed and will also understand which changes cannot be incorporated in the same structure. A designer can do these substitutions without undue experimentation.

This detailed description in connection with the drawings is intended principally as a description of the presently preferred embodiments of the invention and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of any claims.

The invention claimed is:

1. An assembly for minimizing the disengagement of a chain from a chain ring, comprising:
   an inboard leg;
   an outboard leg;
   a first mating portion on the inboard leg; and
   a second mating portion on the outboard leg;

wherein the first mating portion and the second mating portion interfit with one another to connect the inboard leg to the outboard leg;
wherein the first mating portion and the second mating portion are configured to engage with one another by sliding the outboard leg relative to the inboard leg;
a shaft that is configured to pass through at least a portion of the inboard leg; and
a fastener configured to pass through a first aperture in the inboard leg and an elongated second aperture in the outboard leg and configured to contact the shaft.

2. The assembly for minimizing the disengagement of a chain from a chain ring according to claim 1, wherein at least one of the first mating portion and the second mating portion comprise a finger.

3. The assembly for minimizing the disengagement of a chain from a chain ring according to claim 2, wherein the other of the first mating portion and the second mating portion comprises a groove.

4. The assembly for minimizing the disengagement of a chain from a chain ring according to claim 1, wherein when the outboard leg is positioned in a first position, the fastener contacts a first end of the elongated second aperture.

5. The assembly for minimizing the disengagement of a chain from a chain ring according to claim 4, wherein when the outboard leg is positioned in a second position, the fastener contacts a second end of the elongated second aperture.

6. An assembly for minimizing the disengagement of a chain from a chain ring, comprising:
an inboard leg having a first inboard leg aperture and a second inboard leg aperture;
an outboard leg having a first outboard leg aperture and a second outboard leg aperture;
a shaft configured to pass at least partially through the first inboard leg aperture; and
a fastener configured to pass through the second inboard leg aperture and the second outboard leg aperture;
wherein the second outboard leg aperture is elongated and the outboard leg is configured to move between a first position where the fastener contacts a first end of the second outboard leg aperture and a second position where the fastener contacts a second end of the second outboard leg aperture.

7. The assembly for minimizing the disengagement of a chain from a chain ring according to claim 6, wherein the outboard leg is configured to slide relative to the inboard leg.

8. The assembly for minimizing the disengagement of a chain from a chain ring according to claim 7, wherein the outboard leg is configured to slide substantially vertically relative to the inboard leg.

9. The assembly for minimizing the disengagement of a chain from a chain ring according to claim 6, wherein the second elongated aperture is oriented substantially vertically.

10. The assembly for minimizing the disengagement of a chain from a chain ring according to claim 6, wherein engagement of the fastener and the shaft is capable of substantially restricting lateral and vertical movement of the inboard leg.

11. The assembly for minimizing the disengagement of a chain from a chain ring according to claim 6, wherein engagement of the fastener and the shaft is capable of substantially restricting lateral movement of the outboard leg.

12. The assembly for minimizing the disengagement of a chain from a chain ring according to claim 6, wherein the outboard leg includes a first mating portion and the inboard leg includes a second mating portion.

13. The assembly for minimizing the disengagement of a chain from a chain ring according to claim 12, wherein at least one of the first mating portion and the second mating portion comprises a finger.

14. The assembly for minimizing the disengagement of a chain from a chain ring according to claim 13, wherein the other of the first mating portion and the second mating portion comprises a groove.

15. An assembly for minimizing the disengagement of a chain from a chain ring, comprising:
an inboard leg;
an outboard leg slidably secured to the inboard leg;
a shaft configured to pass through at least a portion of the inboard leg;
wherein the outboard leg defines an elongated recess and is configured to slide relative to the inboard leg and remain engaged with the inboard leg after the inboard leg and the outboard leg are slidably secured to one another; and
a stop substantially fixed to the inboard leg and configured to extend into the elongated recess on the outboard leg.

16. The assembly for minimizing the disengagement of a chain from a chain ring according to claim 15, wherein the shaft defines a lateral direction and the outboard leg is configured to slide substantially vertically relative to the shaft.

17. The assembly for minimizing the disengagement of a chain from a chain ring according to claim 15 wherein engagement of the stop and an edge of the elongated recess is capable of substantially restricting lateral movement of the outboard leg.

18. The assembly for minimizing the disengagement of a chain from a chain ring according to claim 15, wherein the outboard leg includes a first mating portion and the inboard leg includes a second mating portion.

* * * * *